US011123761B2

(12) United States Patent
Tomuta et al.

(10) Patent No.: US 11,123,761 B2
(45) Date of Patent: Sep. 21, 2021

(54) METHODS FOR LOADING AND UNLOADING BRUSHES TO AND FROM END-EFFECTOR

(71) Applicant: The Boeing Company, Chicago, IL (US)

(72) Inventors: Raul Tomuta, Stanton, CA (US); Angelica Davancens, Reseda, CA (US); Frederick B. Frontiera, Mt. Pleasant, SC (US); Martin Guirguis, Long Beach, CA (US); Don D. Trend, Huntington Beach, CA (US); Jake B. Weinmann, Signal Hill, CA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 16/513,695

(22) Filed: Jul. 16, 2019

(65) Prior Publication Data

US 2020/0030841 A1 Jan. 30, 2020

Related U.S. Application Data

(62) Division of application No. 15/224,363, filed on Jul. 29, 2016, now Pat. No. 10,406,552.

(Continued)

(51) Int. Cl.
*B25J 15/04* (2006.01)
*B25J 11/00* (2006.01)
(Continued)

(52) U.S. Cl.
CPC ............... *B05C 9/02* (2013.01); *A46B 11/06* (2013.01); *A46B 13/04* (2013.01); *B05C 5/02* (2013.01);
(Continued)

(58) Field of Classification Search
CPC ... B25J 15/04–15/0491; B25J 11/0075; B23Q 2003/15537; B23Q 3/15566; B23Q 3/15503; Y10T 483/10; Y10T 483/17
(Continued)

(56) References Cited

U.S. PATENT DOCUMENTS 1,199,780 A 10/1916 Goodrich
1,314,441 A 8/1919 Stensrud
(Continued)

FOREIGN PATENT DOCUMENTS

CH 647709 2/1985
CN 87201146 1/1988
(Continued)

OTHER PUBLICATIONS

Office Action for Canadian Patent Application No. 2,945,420 dated Oct. 11, 2019.
(Continued)

*Primary Examiner* — Erica E Cadugan
(74) *Attorney, Agent, or Firm* — Kunzler Bean & Adamson

(57) ABSTRACT

A method of manipulating a brush relative to a brush-arm assembly of an end-effector comprises locating a carriage in one of a first position or a second position relative to a stationary component. The method also comprises, with the carriage in one of the first position or the second position, different from the first position, relative to the stationary component, locating the brush-arm assembly of the end-effector with respect to the stationary component so that the brush-arm assembly is in contact with the stationary component. The method further comprises moving the carriage in a second direction toward the stationary component, from the first position to a third position, to load the brush onto the brush-arm assembly, or moving the carriage in a first direc-
(Continued)

tion away from the stationary component from the second position to the first position to unload the brush from the brush-arm assembly.

20 Claims, 21 Drawing Sheets

Related U.S. Application Data

(60) Provisional application No. 62/242,216, filed on Oct. 15, 2015.

(51) Int. Cl.

| | |
|---|---|
| *B05C 9/02* | (2006.01) |
| *B23Q 3/155* | (2006.01) |
| *B23P 19/02* | (2006.01) |
| *B23P 19/04* | (2006.01) |
| *B25J 9/16* | (2006.01) |
| *B05C 5/02* | (2006.01) |
| *B05D 7/24* | (2006.01) |
| *B05C 11/10* | (2006.01) |
| *A46B 13/04* | (2006.01) |
| *A46B 11/06* | (2006.01) |
| *B05C 1/06* | (2006.01) |
| *B05C 1/02* | (2006.01) |

(52) U.S. Cl.
CPC .......... *B05C 11/10* (2013.01); *B05C 11/1002* (2013.01); *B05D 7/24* (2013.01); *B23P 19/02* (2013.01); *B23P 19/04* (2013.01); *B23Q 3/15566* (2013.01); *B25J 9/1679* (2013.01); *B25J 9/1692* (2013.01); *B25J 11/0075* (2013.01); *B25J 15/0491* (2013.01); *B05C 1/027* (2013.01); *B05C 1/06* (2013.01); *B23Q 2003/15537* (2016.11); *Y10S 483/901* (2013.01); *Y10S 901/02* (2013.01); *Y10S 901/43* (2013.01); *Y10T 29/49815* (2015.01); *Y10T 29/49819* (2015.01); *Y10T 483/17* (2015.01)

(58) Field of Classification Search
USPC .................................. 483/54, 902, 45, 1, 16
See application file for complete search history.

(56) References Cited

U.S. PATENT DOCUMENTS

| | | | |
|---|---|---|---|
| 1,330,001 A | 2/1920 | Swanson | |
| 1,465,856 A | 8/1923 | Marsh | |
| 1,475,079 A | 11/1923 | William | |
| 1,979,240 A | 11/1934 | Adelmann | |
| 2,064,318 A | 12/1936 | Platt et al. | |
| 2,227,792 A | 1/1941 | Norton | |
| 2,321,961 A | 6/1943 | Wilde | |
| 2,590,977 A | 4/1952 | Gordon | |
| 2,747,217 A | 5/1956 | Stahl | |
| 2,859,564 A | 11/1958 | Farmer et al. | |
| 3,425,080 A | 2/1969 | Dolitzsch | |
| 3,860,987 A | 1/1975 | Bolli et al. | |
| 3,872,533 A | 3/1975 | Proffit | |
| 3,994,041 A | 11/1976 | Barber | |
| 4,570,282 A | 2/1986 | Martin et al. | |
| 4,881,289 A | 11/1989 | Tsuyoshi et al. | |
| 5,027,463 A | 7/1991 | Daub | |
| 5,171,095 A | 12/1992 | Davies et al. | |
| 6,409,103 B1 | 6/2002 | Norville | |
| 6,722,956 B2 | 4/2004 | Okuyama et al. | |
| 7,386,911 B2 | 6/2008 | Stoll | |
| 8,651,046 B1 | 2/2014 | Davancens et al. | |
| 10,406,552 B2 * | 9/2019 | Tomuta | B05C 11/1002 |
| 2004/0255410 A1 | 12/2004 | Schonewille | |
| 2005/0003077 A1 | 1/2005 | Kamata et al. | |
| 2007/0026773 A1 | 2/2007 | Vogel | |
| 2007/0050938 A1 | 3/2007 | Rosenzweig | |
| 2009/0080964 A1 | 3/2009 | Castellana | |
| 2015/0064357 A1 | 3/2015 | Tomuta et al. | |
| 2017/0105512 A1 | 4/2017 | Tomuta et al. | |
| 2017/0105513 A1 | 4/2017 | Davancens et al. | |
| 2017/0105514 A1 | 4/2017 | Tomuta et al. | |
| 2020/0008569 A1 | 1/2020 | Tomuta et al. | |
| 2020/0093250 A1 | 3/2020 | Davancens et al. | |

FOREIGN PATENT DOCUMENTS

| | | | |
|---|---|---|---|
| CN | 104415878 | | 3/2015 |
| DE | 3320598 | | 12/1984 |
| DE | 3634018 | | 4/1988 |
| DE | 102006050722 | | 4/2008 |
| DE | 102008014358 | | 10/2009 |
| DE | 102008039804 | | 2/2010 |
| EP | 0444436 | A2 | 9/1991 |
| EP | 0925742 | A2 | 6/1999 |
| EP | 2842457 | | 3/2015 |
| JP | 2001-353611 | A * | 12/2001 |
| JP | 201547602 | | 3/2015 |
| JP | 2019-107747 | A * | 7/2019 |
| KR | 10-2009-0013973 | | 2/2009 |
| WO | 03070051 | A1 | 8/2003 |

OTHER PUBLICATIONS

Office Action for Chinese Patent Application No. 201610885794.3 dated Sep. 20, 2019.
Extended European Search Report for EP Application No. 16193053.2 dated Mar. 2, 2017.
Extended European Search Report for EP Application No. 16193055.7 dated Mar. 6, 2017.
Aerospace Dispensing Systems, Foil's New Aerospace Division Blog dated Oct. 3, 2013, http://fori-aerospace.blogspot.com/2013/10/aerospace-dispensing-systems.html, Fori Automation, Inc., accessed Jun. 2, 2016.
Office Action for Chinese Patent Application No. 201610885794.3 dated May 14, 2019.
Office Action for Chinese Patent Application No. 201610885791.X dated Feb. 3, 2020.
Office Action for Canadian Patent Application No. 2945420 dated Jul. 14, 2020.
Extended European Search Report concerning European Patent Application No. 20168265.5 dated Aug. 3, 2020.
Japanese Office Action concerning Japanese Patent Application No. 2016-199906 dated Jul. 30, 2020.
Office Action for Canadian Patent Application No. 2,945,420 dated Nov. 6, 2019.
Japanese Office Action concerning Japanese Patent Application No. 2016-199906 dated Dec. 1, 2020.
Office Action for Brazlian Patent Application No. BR102016023781-5 dated Feb. 6, 2020.
Office Action for Brazlian Patent Application No. BR102016023775-0 dated Mar. 25, 2020.
Office Action for Canadian Patent Application No. 2945362 dated Apr. 17, 2020.
Brazilian Office Action concerning Brazilian Patent Application No. BR102016023781-5 dated Jul. 16, 2021.

* cited by examiner

902 — LOCATING A CARRIAGE (818), COMPRISING A BRUSH RECEPTACLE (820), IN ONE OF A FIRST POSITION OR A SECOND POSITION RELATIVE TO A STATIONARY COMPONENT (832), WHEREIN THE CARRIAGE (818) IS SELECTIVELY MOVABLE RELATIVE TO THE STATIONARY COMPONENT (832) ALONG AN AXIS (A)

904 — WITH THE CARRIAGE (818) IN ONE OF THE FIRST POSITION OR THE SECOND POSITION, DIFFERENT FROM THE FIRST POSITION, RELATIVE TO THE STATIONARY COMPONENT (832), LOCATING THE BRUSH-ARM ASSEMBLY (802) OF THE END-EFFECTOR (102) WITH RESPECT TO THE STATIONARY COMPONENT (832) SO THAT THE BRUSH-ARM ASSEMBLY (802) IS IN CONTACT WITH THE STATIONARY COMPONENT (832)

906 — MOVING THE CARRIAGE (818) IN A SECOND DIRECTION ALONG THE AXIS (A) TOWARD THE STATIONARY COMPONENT (832), FROM THE FIRST POSITION TO A THIRD POSITION, TO LOAD THE BRUSH (822) ONTO THE BRUSH-ARM ASSEMBLY (802) OF THE END-EFFECTOR (102), OR MOVING THE CARRIAGE (818) IN A FIRST DIRECTION ALONG THE AXIS (A) AWAY FROM THE STATIONARY COMPONENT (832) FROM THE SECOND POSITION TO THE FIRST POSITION TO UNLOAD THE BRUSH (822) FROM THE BRUSH-ARM ASSEMBLY (802)

908 — THE SECOND POSITION OF THE CARRIAGE (818) RELATIVE TO THE STATIONARY COMPONENT (832) IS IDENTICAL TO THE THIRD POSITION OF THE CARRIAGE (818) RELATIVE TO THE STATIONARY COMPONENT (832)

910 — WHEN THE CARRIAGE (818) IS IN THE FIRST POSITION RELATIVE TO THE STATIONARY COMPONENT (832), LOCATING THE BRUSH-ARM ASSEMBLY (802) OF THE END-EFFECTOR (102) WITH RESPECT TO THE STATIONARY COMPONENT (832), SUCH THAT THE BRUSH-ARM ASSEMBLY (802) IS IN CONTACT WITH THE STATIONARY COMPONENT (832), COMPRISES MATING THE BRUSH-ARM ASSEMBLY (802) WITH A SLOT (834) OF THE STATIONARY COMPONENT (832), WHEREIN THE SLOT (834) OF THE STATIONARY COMPONENT (832) IS ALIGNED WITH THE BRUSH RECEPTACLE (820), WHICH CONTAINS THE BRUSH (822), ALONG A SECOND AXIS, COINCIDENT WITH OR PARALLEL TO THE AXIS (A)

912 — WITH THE CARRIAGE (818) IN THE FIRST POSITION RELATIVE TO THE STATIONARY COMPONENT (832) AND THE BRUSH-ARM ASSEMBLY (802) OF THE END-EFFECTOR (102) MATED WITH THE SLOT (834) OF THE STATIONARY COMPONENT (832), LOADING THE BRUSH (822), LOCATED IN THE BRUSH RECEPTACLE (820) OF THE CARRIAGE (818), ONTO THE BRUSH-ARM ASSEMBLY (802) OF THE END-EFFECTOR (102) BY SELECTIVELY MOVING THE CARRIAGE (818) IN THE SECOND DIRECTION RELATIVE TO THE STATIONARY COMPONENT (832) FROM THE FIRST POSITION TO THE THIRD POSITION

914 — WITH THE CARRIAGE (818) IN THE SECOND POSITION AND THE BRUSH (822) LOADED ONTO THE BRUSH-ARM ASSEMBLY (802) OF THE END-EFFECTOR (102), SELECTIVELY MOVING THE CARRIAGE (818) RELATIVE TO THE STATIONARY COMPONENT (832) AND THE BRUSH-ARM ASSEMBLY (802), IN THE FIRST DIRECTION, INTO THE FIRST POSITION TO REMOVE THE BRUSH (822) FROM THE BRUSH RECEPTACLE (820)

WHEN THE CARRIAGE (818) IS IN THE SECOND POSITION RELATIVE TO THE STATIONARY COMPONENT (832), LOCATING THE BRUSH-ARM ASSEMBLY (802) OF THE END-EFFECTOR (102) WITH RESPECT TO THE STATIONARY COMPONENT (832) SO THAT THE BRUSH-ARM ASSEMBLY (802) IS IN CONTACT WITH THE STATIONARY COMPONENT (832) COMPRISES RESTING THE BRUSH-ARM ASSEMBLY (802) ON A TOOL-SUPPORT ARM (836), FIXED RELATIVE TO THE STATIONARY COMPONENT (832)

918

WITH THE CARRIAGE (818) IN THE SECOND POSITION, PLACING A PORTION OF THE BRUSH (822), LOADED ONTO THE BRUSH-ARM ASSEMBLY (802) OF THE END-EFFECTOR (102), BETWEEN TWO BLADES (824), OPPOSING EACH OTHER AND FIXED TO THE CARRIAGE (818), WHEREIN A GAP (826), DEFINED BETWEEN THE TWO BLADES (824), IS NARROWER THAN AT LEAST A PORTION OF A HEAD (825) OF THE BRUSH (822) AND WHEREIN AT LEAST THE PORTION OF THE HEAD (825) OF THE BRUSH (822) AND AT LEAST A PORTION OF A SHANK (827) OF THE BRUSH (822) ARE ON OPPOSITE SIDES OF THE TWO BLADES (824)

920

WITH THE CARRIAGE (818) IN THE SECOND POSITION AND THE PORTION OF THE BRUSH (822), LOADED ONTO THE BRUSH-ARM ASSEMBLY (802) OF THE END-EFFECTOR (102), BETWEEN THE TWO BLADES (824), MOVING THE CARRIAGE (818) IN THE FIRST DIRECTION TO THE FIRST POSITION TO UNLOAD THE BRUSH (822) FROM THE BRUSH-ARM ASSEMBLY (802)

922

WHEN THE CARRIAGE (818) IS IN THE FIRST POSITION RELATIVE TO THE STATIONARY COMPONENT (832), LOCATING THE BRUSH-ARM ASSEMBLY (802) OF THE END-EFFECTOR (102) WITH RESPECT TO THE STATIONARY COMPONENT (832), SUCH THAT THE BRUSH-ARM ASSEMBLY (802) IS IN CONTACT WITH THE STATIONARY COMPONENT (832), COMPRISES MATING THE BRUSH-ARM ASSEMBLY (802) WITH A SECOND SLOT (835) OF THE STATIONARY COMPONENT (832), WHEREIN THE SECOND SLOT (835) OF THE STATIONARY COMPONENT (832) IS ALIGNED ALONG A THIRD AXIS, COINCIDENT WITH OR PARALLEL TO THE AXIS (A), WITH A TOOL RECEPTACLE (828), WHICH CONTAINS A CALIBRATION TOOL (830), HAVING A SECOND SYMMETRY AXIS (C) AND A TOOL TIP (831)

924

WITH THE BRUSH-ARM ASSEMBLY (802) OF THE END-EFFECTOR (102) MATED WITH THE SECOND SLOT (835) OF THE STATIONARY COMPONENT (832), SELECTIVELY MOVING THE CARRIAGE (818) RELATIVE TO THE STATIONARY COMPONENT (832) AND THE BRUSH-ARM ASSEMBLY (802), IN THE SECOND DIRECTION, INTO THE SECOND POSITION TO LOAD THE CALIBRATION TOOL (830) ONTO THE BRUSH-ARM ASSEMBLY (802) OF THE END-EFFECTOR (102)

926

SELECTIVELY PREVENTING MOVEMENT OF THE CALIBRATION TOOL (830) IN THE SECOND DIRECTION RELATIVE TO THE CARRIAGE (818)

928

SELECTIVELY PREVENTING MOVEMENT OF THE CALIBRATION TOOL (830) RELATIVE TO THE CARRIAGE (818) IN THE SECOND DIRECTION COMPRISES SELECTIVELY ENGAGING AT LEAST ONE PIN (842) WITH THE CALIBRATION TOOL (830) WHEN THE CALIBRATION TOOL (830) IS PLACED IN THE TOOL RECEPTACLE (828)

930

DISENGAGING AT LEAST THE ONE PIN (842) FROM THE CALIBRATION TOOL (830) TO SELECTIVELY ENABLE THE MOVEMENT OF THE CALIBRATION TOOL (830) IN THE SECOND DIRECTION RELATIVE TO THE CARRIAGE (818)

932
WITH THE BRUSH-ARM ASSEMBLY (802) OF THE END-EFFECTOR (102) MATED WITH THE SECOND SLOT (835) OF THE STATIONARY COMPONENT (832), SELECTIVELY MOVING THE CARRIAGE (818) RELATIVE TO THE STATIONARY COMPONENT (832) AND THE BRUSH-ARM ASSEMBLY (802) OF THE END-EFFECTOR (102), IN THE SECOND DIRECTION, INTO THE SECOND POSITION TO LOAD THE CALIBRATION TOOL (830) ONTO THE BRUSH-ARM ASSEMBLY (802) OF THE END-EFFECTOR (102)

934
CALIBRATING A CONTROLLER (810), OPERATIVELY COUPLED WITH THE BRUSH-ARM ASSEMBLY (802) OF THE END-EFFECTOR (102), BY DETERMINING, RELATIVE TO THE BRUSH-ARM ASSEMBLY (802) OF THE END-EFFECTOR (102), PARAMETERS COMPRISING AN ORIENTATION OF THE SECOND SYMMETRY AXIS (C) OF THE CALIBRATION TOOL (830), LOADED ONTO THE BRUSH-ARM ASSEMBLY (802), AND GENERATING AN OUTPUT OF THE PARAMETERS

936
THE PARAMETERS FURTHER COMPRISE A FIRST OFFSET OF THE TOOL TIP (831) OF THE CALIBRATION TOOL (830), LOADED ONTO THE BRUSH-ARM ASSEMBLY (802), FROM THE BRUSH-ARM ASSEMBLY (802)

938
THE PARAMETERS ARE DETERMINED USING A VISION SYSTEM (808)

940
THE VISION SYSTEM (808) CAPTURES AT LEAST ONE IMAGE OF THE CALIBRATION TOOL (830) THAT IS LOADED ONTO THE BRUSH-ARM ASSEMBLY (802) AND, BASED ON AT LEAST THE ONE IMAGE, DETERMINES, RELATIVE TO THE BRUSH-ARM ASSEMBLY (802) OF THE END-EFFECTOR (102), THE ORIENTATION OF THE SECOND SYMMETRY AXIS (C) OF THE CALIBRATION TOOL (830)

942
DETERMINING A SECOND OFFSET OF A BRUSH TIP (823), FROM THE BRUSH-ARM ASSEMBLY (802), BY ONE OF SUBTRACTING OR ADDING AN ARCHIVED VALUE, CORRESPONDING TO A DIFFERENCE BETWEEN THE FIRST OFFSET OF THE TOOL TIP (831) OF THE CALIBRATION TOOL (830) AND THE SECOND OFFSET OF THE BRUSH TIP (823), TO OR FROM THE FIRST OFFSET OF THE TOOL TIP (831) OF THE CALIBRATION TOOL (830)

944
CALIBRATING THE CONTROLLER (810) FURTHER COMPRISES MANUALLY MATING THE BRUSH-ARM ASSEMBLY (802) WITH A SLOT (834) OF THE STATIONARY COMPONENT (832) AND PROGRAMMING THE CONTROLLER (810) WITH DATA, REPRESENTING A POSITION OF THE BRUSH-ARM ASSEMBLY (802), MATED WITH THE SLOT (834), RELATIVE TO THE STATIONARY COMPONENT (832)

*FIG. 18C*

METHODS FOR LOADING AND UNLOADING BRUSHES TO AND FROM END-EFFECTOR

TECHNICAL FIELD

The present disclosure relates to systems, apparatuses, and methods for manipulating brushes relative to an end-effector of a robot.

BACKGROUND

It is commonplace to use manual techniques to apply glutinous substances, such as sealants, adhesives, and fillers, to surfaces of structures or other objects for purposes of sealing, corrosion-resistance mitigation, and/or fixation, among others. However, manual surface application of glutinous substances in a uniform, repeatable manner is difficult and time consuming.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an apparatus for loading and unloading a brush to and from a brush-arm assembly of an end-effector. The apparatus comprises a base, defining a base plane. The apparatus also comprises a carriage, movable along an axis at least to a first position, a second position, or a third position relative to the base. The second position and the third position are different from the first position. The axis is parallel to the base plane. The carriage comprises a brush receptacle, configured to prevent movement of the brush relative to the carriage in a first direction, parallel to the axis, but not in a second direction, opposite to the first direction, when the brush is placed in the brush receptacle. Additionally, the apparatus comprises a stationary component, fixed relative to the base and configured to prevent movement of the brush-arm assembly of the end-effector relative to the base in the second direction. The apparatus further comprises a linear actuator, configured to move the carriage relative to the base.

Use of the end-effector allows for automated application of glutinous substances using the brush, loaded into the brush-arm assembly. Use of the base, that defines the base plane, provides a supporting foundation and structure for the various components of the apparatus and keeps the apparatus secure, while the carriage is moved into place to load and/or unload the brush to/from the brush-arm assembly. Use of the carriage allows for reliable and efficient loading and unloading of the brush to/from the brush-arm assembly of the end-effector by moving along the axis that is parallel to the base plane in a first or a second direction between a first position, a second position, and a third position. Use of the brush receptacle provides a secure holding location for the brush until the brush is loaded into the brush-arm assembly. Use of the stationary component prevents movement of the brush-arm assembly when the carriage is moved into position to load the brush into the brush-arm assembly. Use of the linear actuator allows the carriage to reliably move relative to the base to load and/or unload the brush to/from the brush-arm assembly.

Another example of the subject matter according to the invention relates to a system for applying a glutinous substance to a work piece using a brush, having a brush tip. The system comprises an end-effector, comprising a brush-arm assembly. The system also comprises a robot, configured to manipulate the end-effector. Furthermore, the system comprises an apparatus that comprises a base, defining a base plane. The apparatus also comprises a carriage, movable along an axis at least to a first position, a second position, or a third position relative to the base. The second position and the third position are different from the first position. The axis is parallel to the base plane. The carriage comprises a brush receptacle, configured to prevent movement of the brush relative to the carriage in a first direction, parallel to the axis, but not in a second direction, opposite to the first direction, when the brush is placed in the brush receptacle. The apparatus further comprises a stationary component, fixed to the base and configured to engage the end-effector to prevent movement of the end-effector relative to the base in the second direction. The apparatus also comprises a linear actuator, configured to move the carriage relative to the base. The system further comprises a controller, operatively coupled with at least one of the robot or the apparatus.

Use of the end-effector allows for automated application of glutinous substances using the brush, loaded into the brush-arm assembly. Use of the robot, controlled by the controller, provides automated control of the end-effector, including the brush-arm assembly and the apparatus. Use of the base, that defines the base plane, provides a supporting foundation and structure for the various components of the apparatus and keeps the apparatus secure, while the carriage is moved into place to load and/or unload the brush to/from the brush-arm assembly. Use of the carriage allows for reliable and efficient loading and unloading of the brush to/from the brush-arm assembly of the end-effector by moving along the axis that is parallel to the base plane in a first or a second direction between a first position, a second position, and a third position. Use of the brush receptacle provides a secure holding location for the brush until the brush is loaded into the brush-arm assembly. Use of the stationary component prevents movement of the brush-arm assembly when the carriage is moved into position to load the brush into the brush-arm assembly. Use of the linear actuator allows the carriage to reliably move relative to the base to load and/or unload the brush to/from the brush-arm assembly.

Yet another example of the subject matter according to the invention relates to a method of manipulating a brush relative to a brush-arm assembly of an end-effector. The method comprises locating a carriage, comprising a brush receptacle, in one of a first position or a second position relative to a stationary component. The carriage is selectively movable relative to the stationary component along an axis. The method also comprises, with the carriage in one of the first position or the second position, different from the first position, relative to the stationary component, locating the brush-arm assembly of the end-effector with respect to the stationary component so that the brush-arm assembly is in contact with the stationary component. The method further comprises moving the carriage in a second direction along the axis toward the stationary component, from the first position to a third position, to load the brush onto the brush-arm assembly of the end-effector, or moving the carriage in a first direction along the axis away from the stationary component from the second position to the first position to unload the brush from the brush-arm assembly.

Use of the end-effector allows for automated application of glutinous substances using the brush, loaded into the brush-arm assembly. Use of the base, that defines a base plane, provides a supporting foundation and structure for the various components used to perform the method and secures the components while the carriage is moved into place to load and/or unload the brush to/from the brush-arm assembly. Use of the carriage allows for reliable and efficient loading and unloading of the brush to/from the brush-arm assembly of the end-effector by moving along an axis that is parallel to the base plane in a first or a second direction between a first position, a second position, and a third position. Use of the brush receptacle provides a secure holding location for the brush until the brush is loaded into the brush-arm assembly. Use of the stationary component prevents movement of brush-arm assembly when the carriage is moved into position to load the brush into the brush-arm assembly.

BRIEF DESCRIPTION OF THE DRAWINGS

Figure 1:
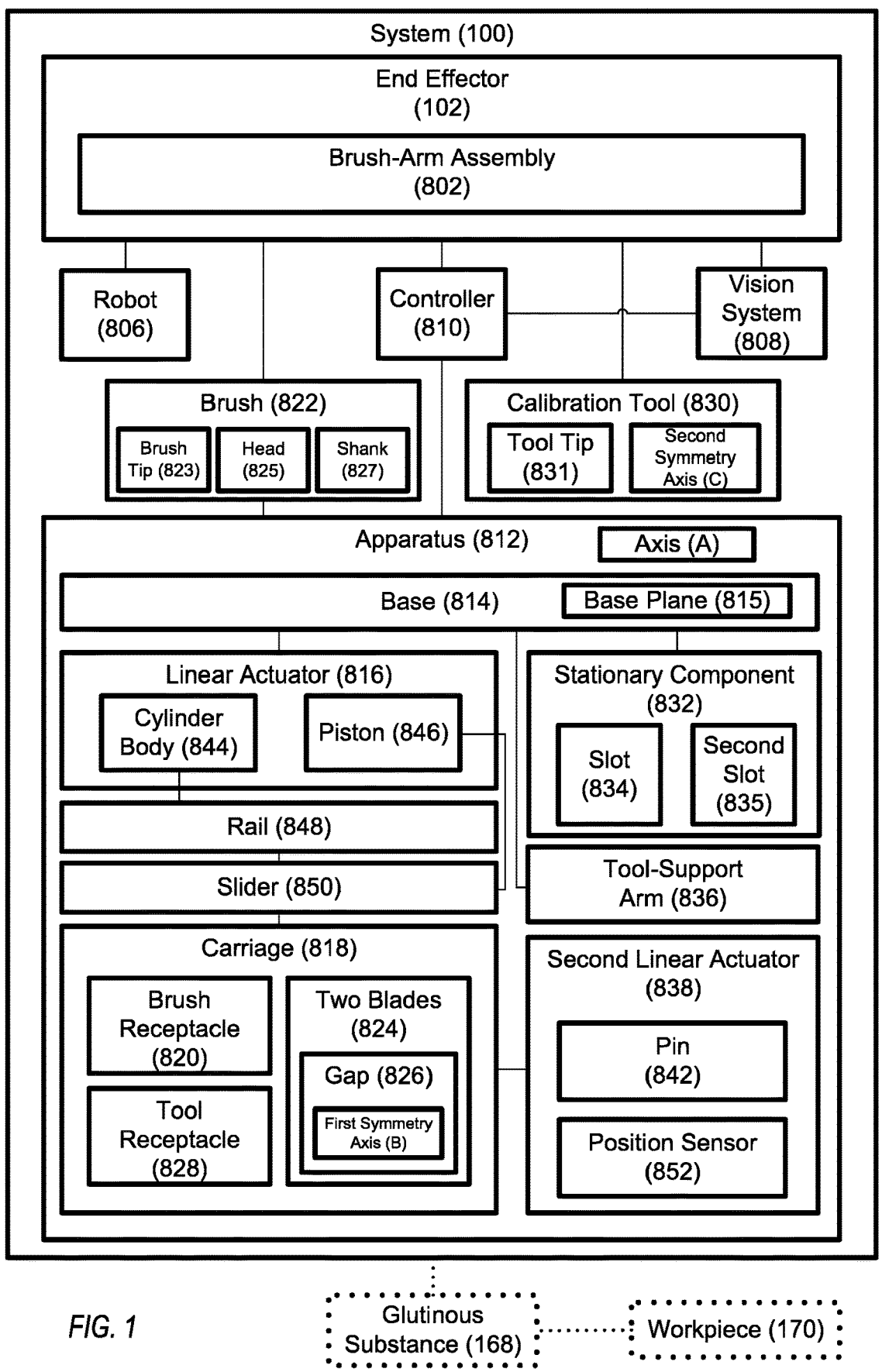
Figure 2:
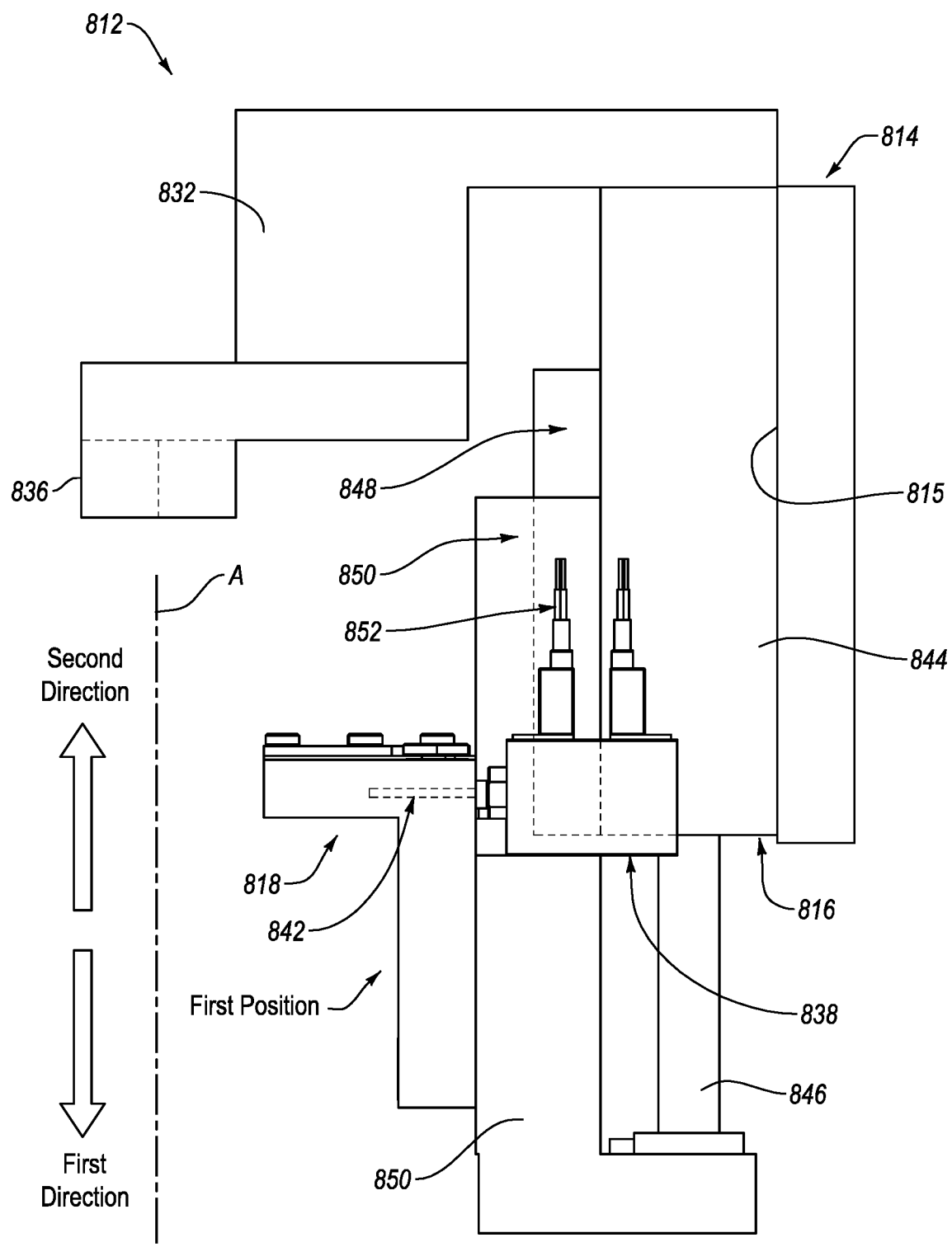
Figure 3:
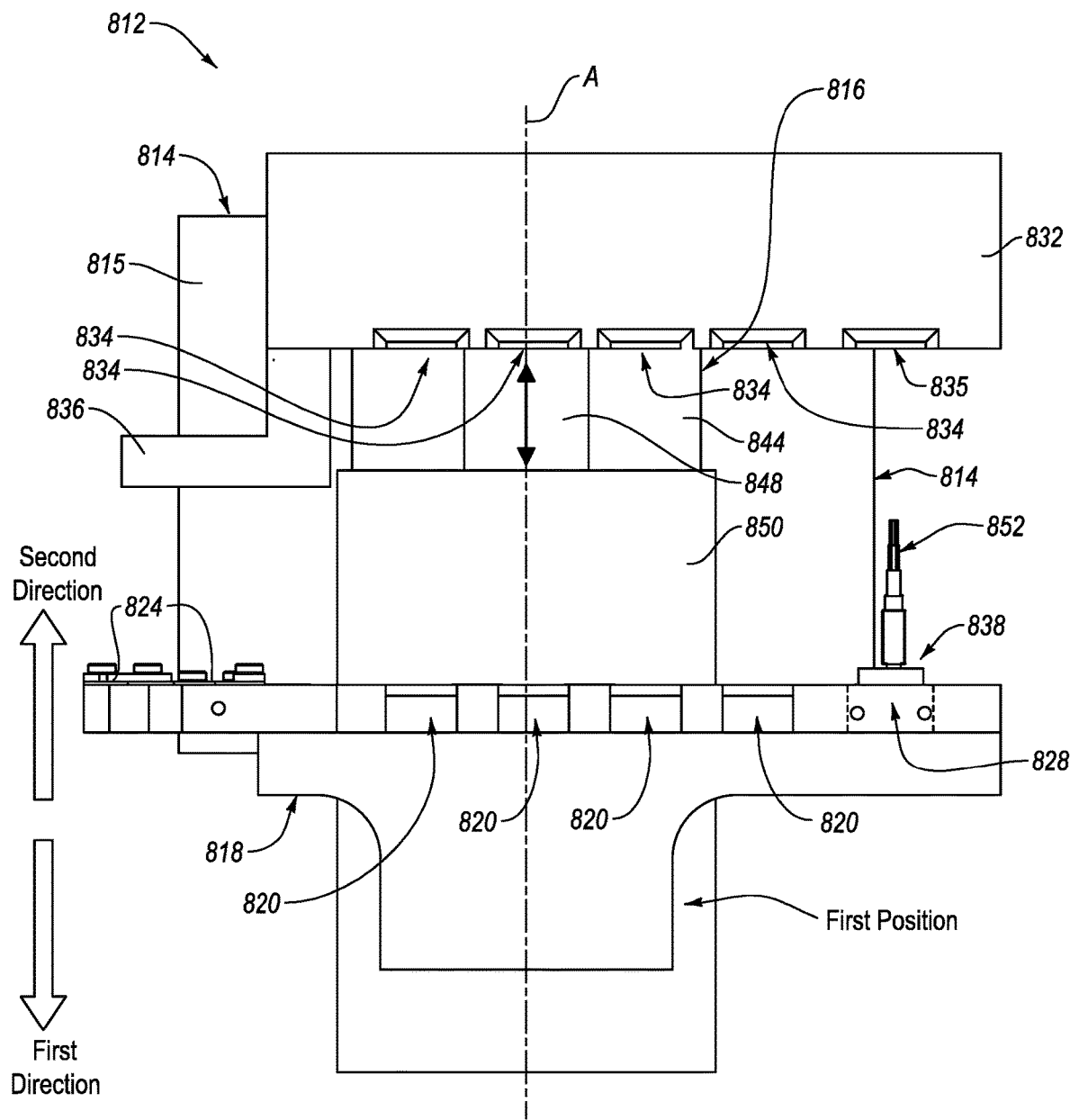
Figure 4:
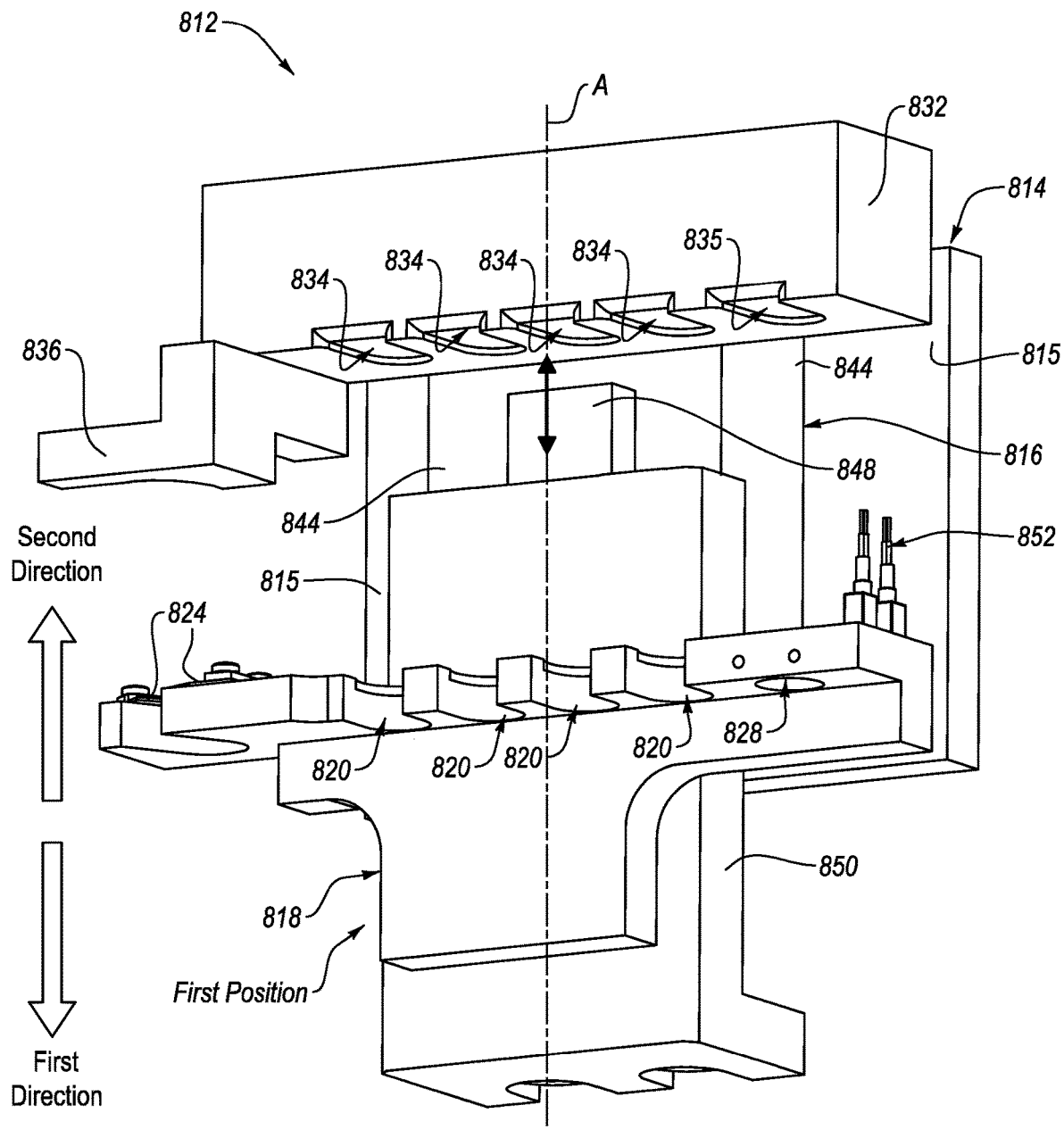
Figure 5:
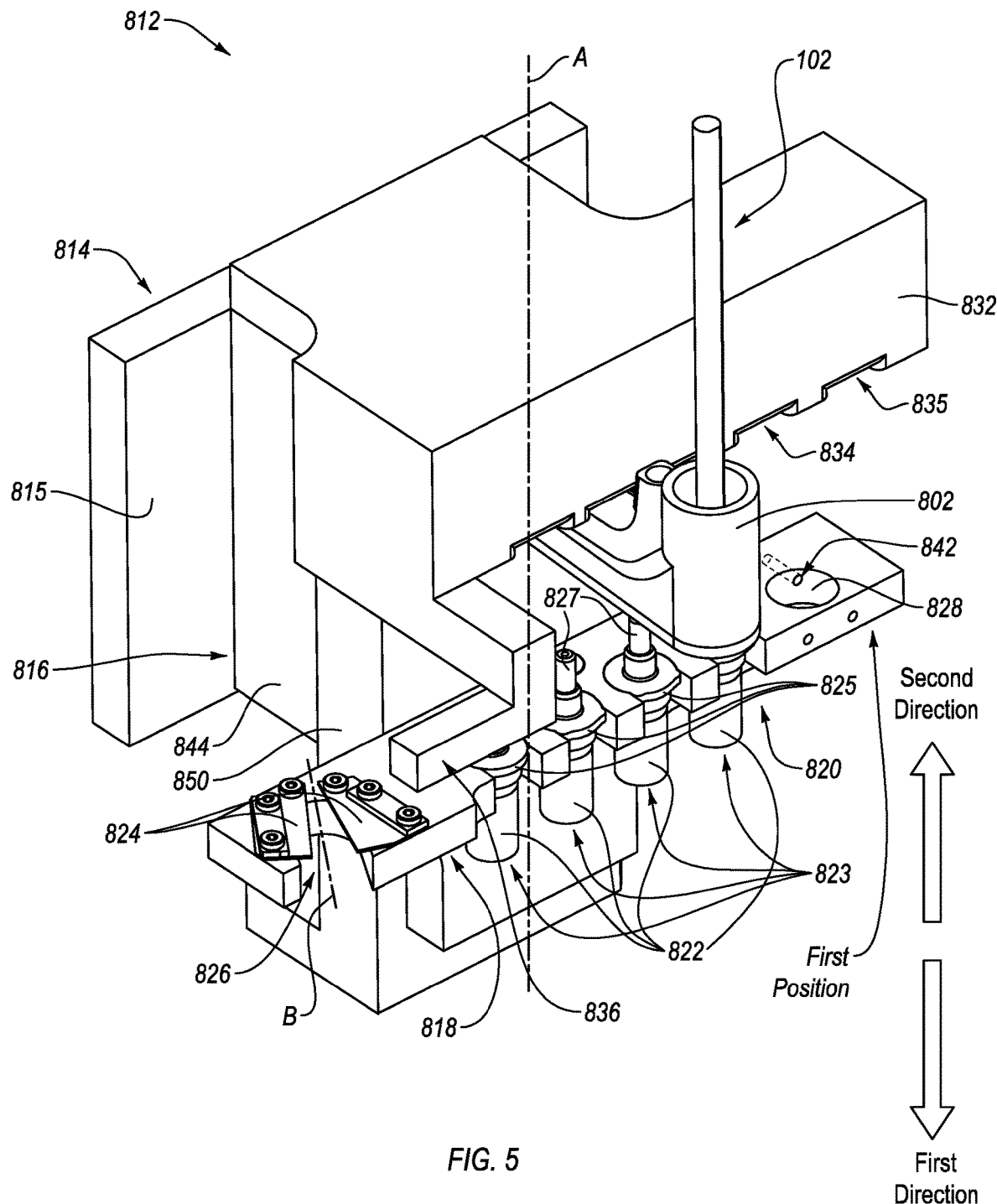
Figure 6:
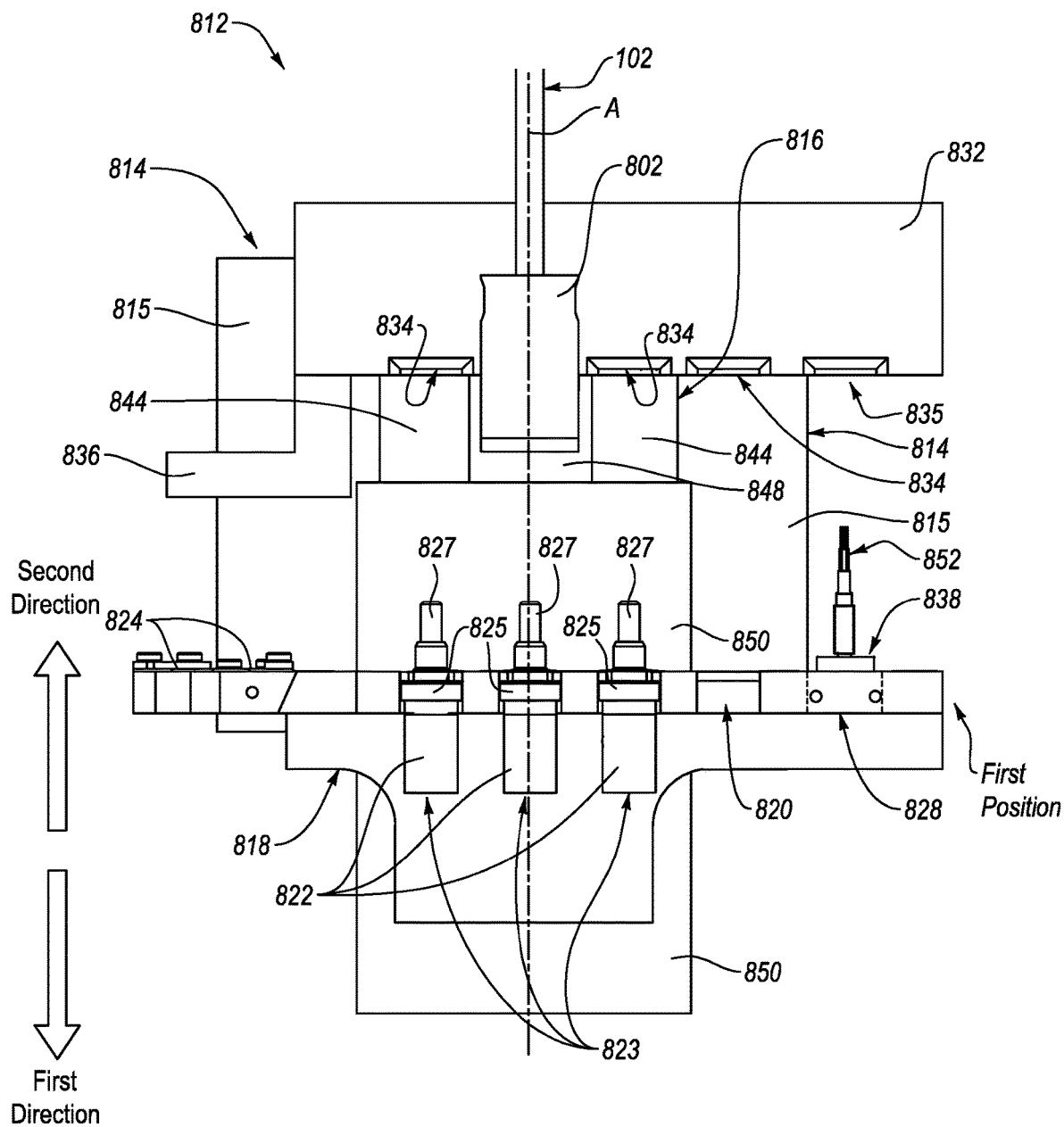
Figure 7:
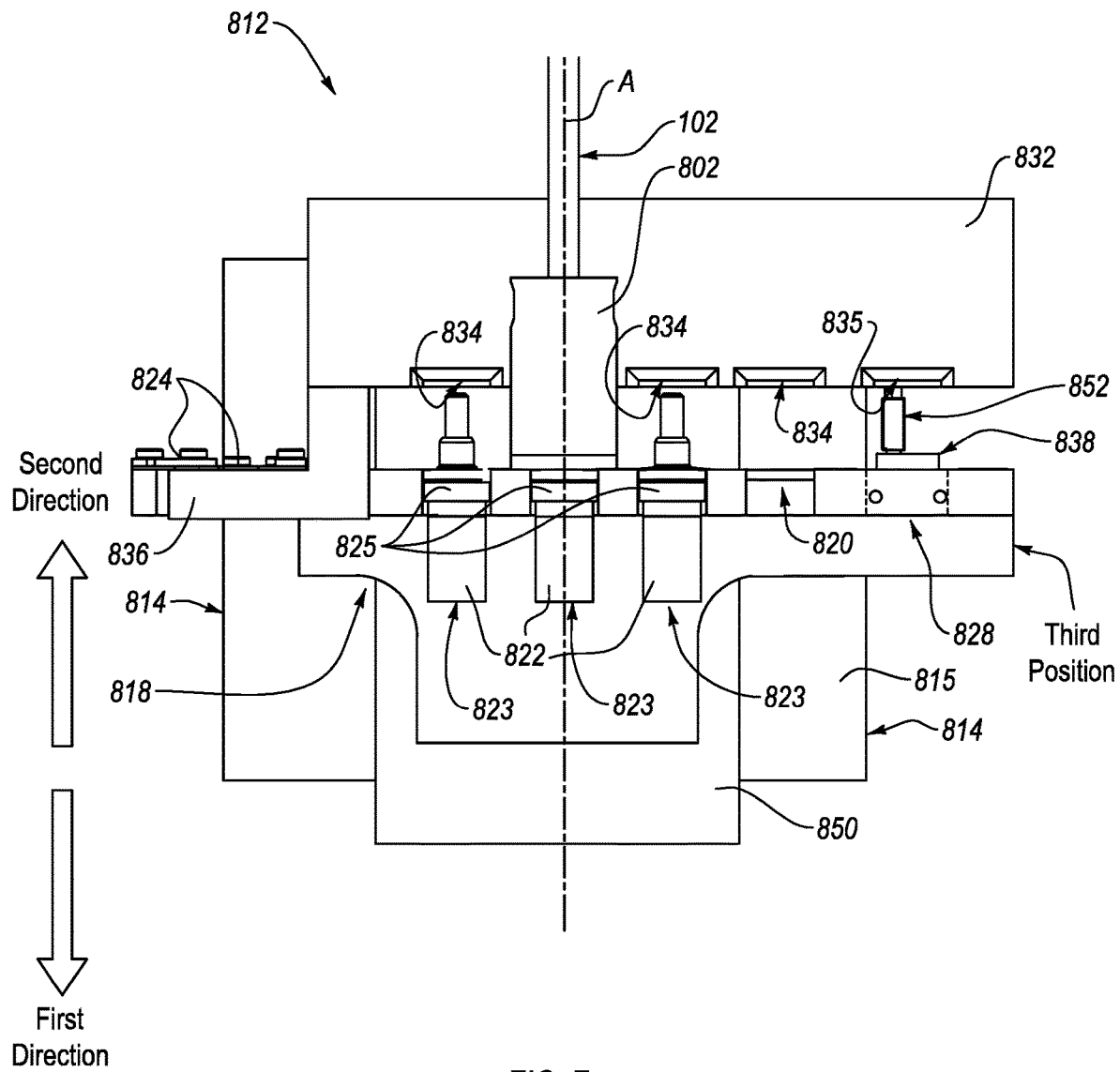
Figure 8:
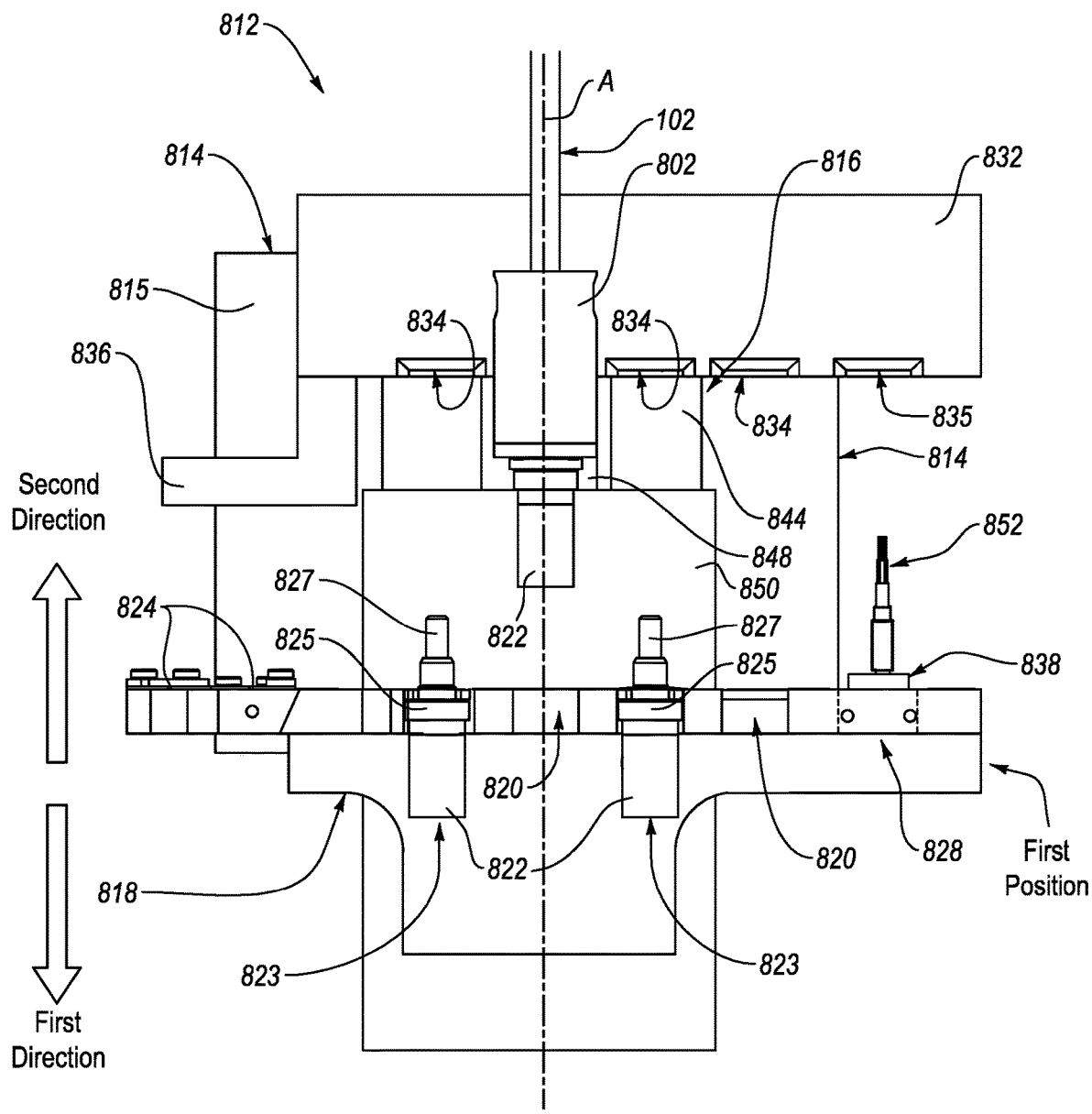
Figure 9:
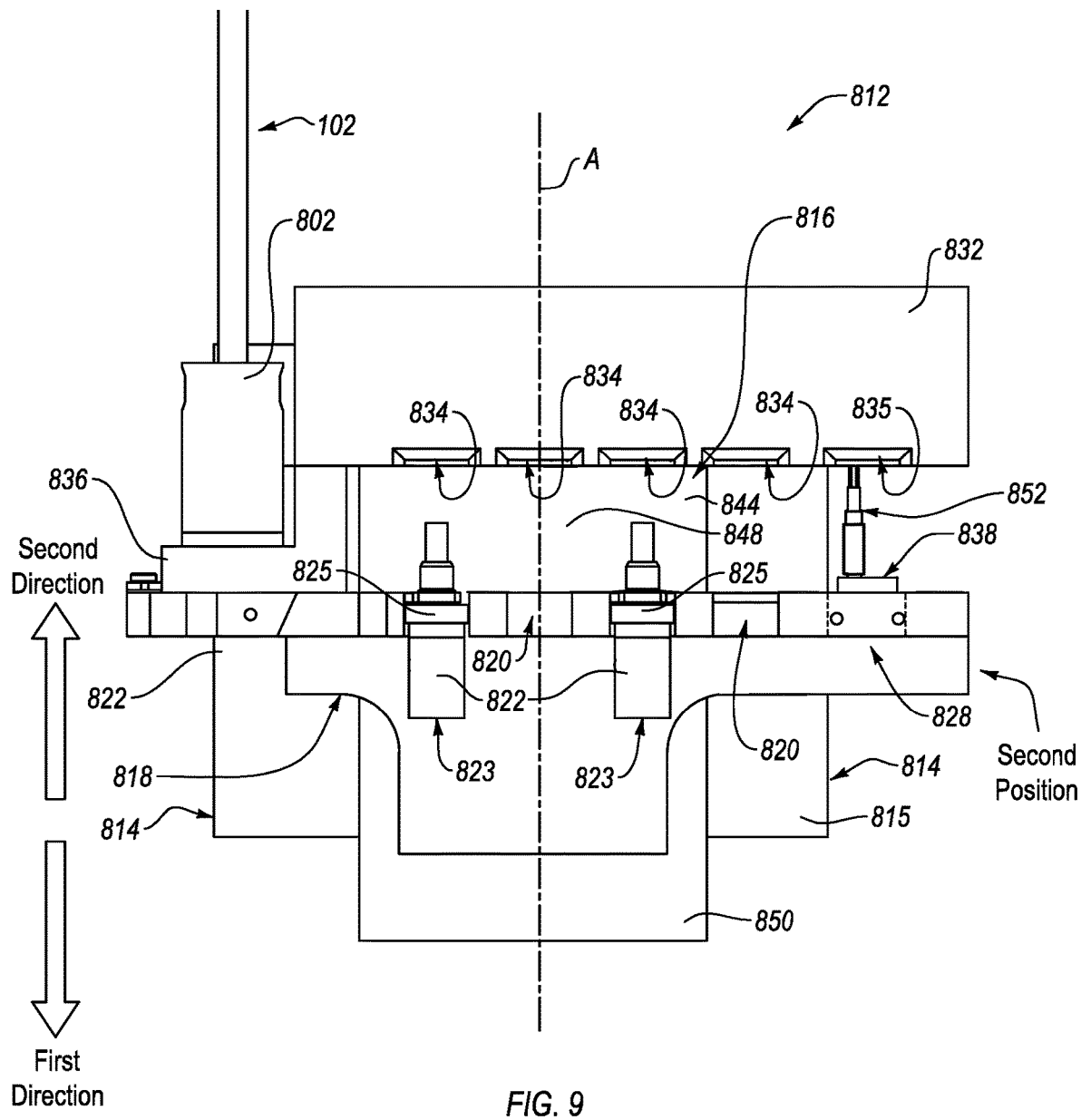
Figure 10:
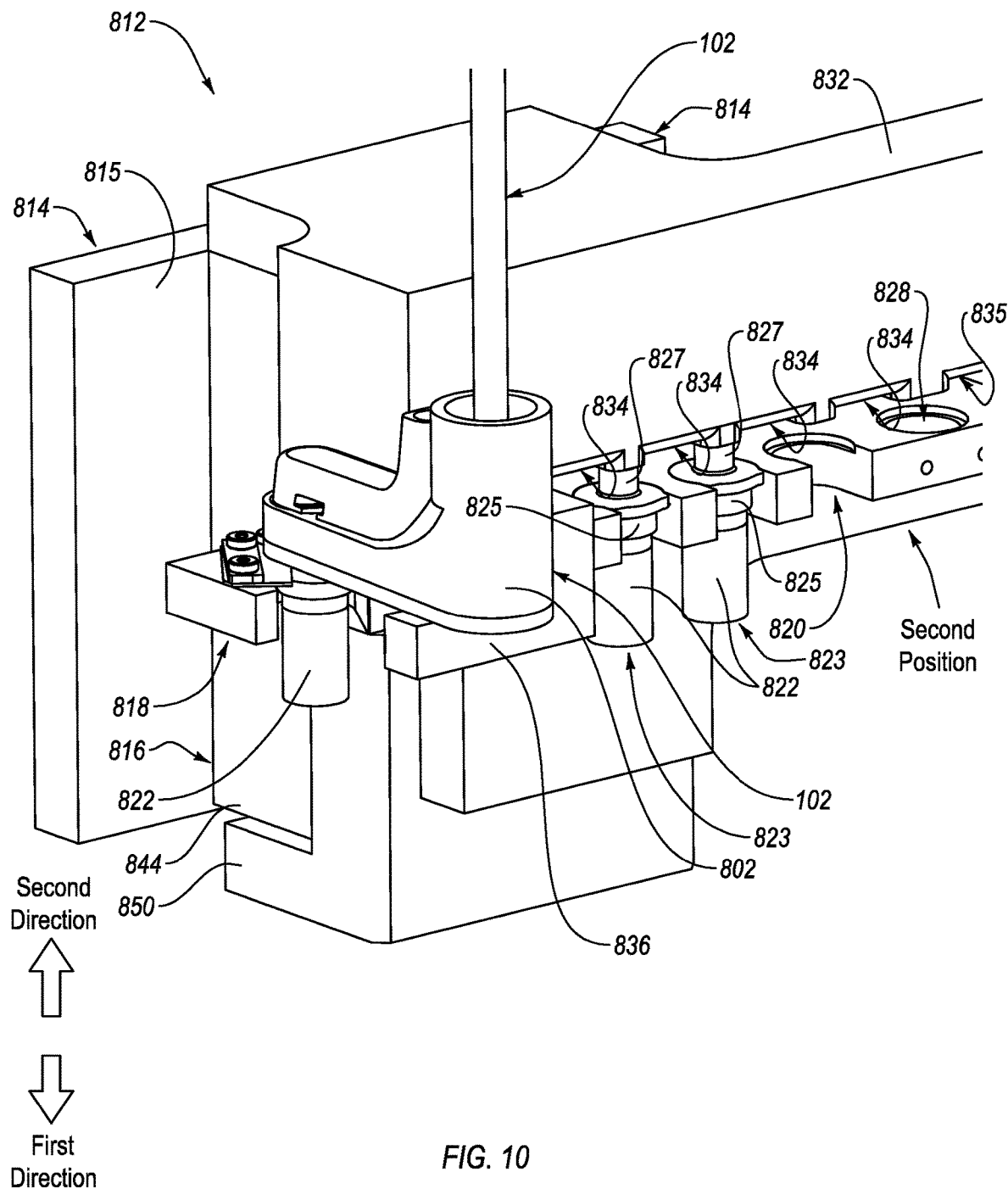
Figure 11:
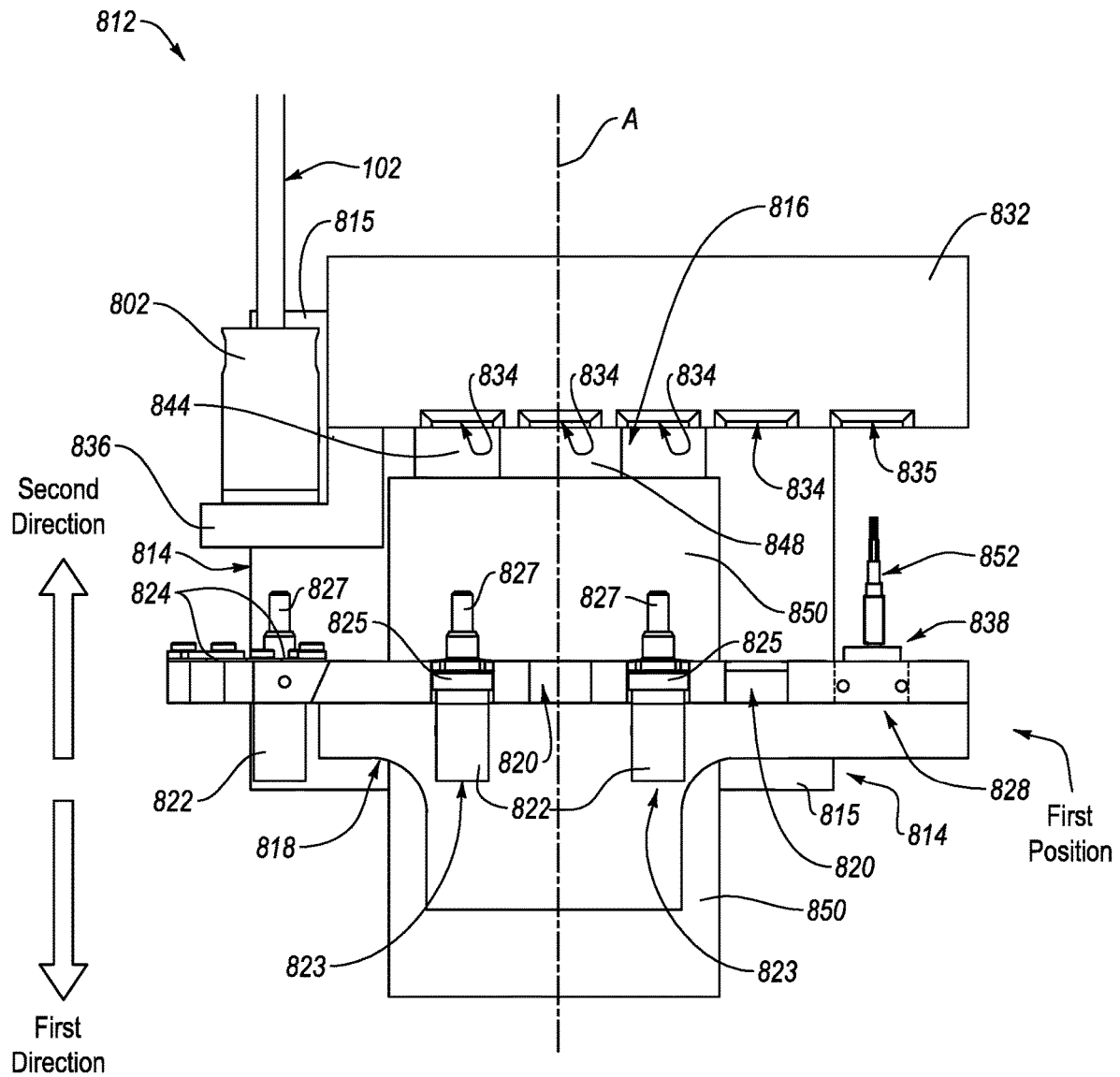
Figure 12:
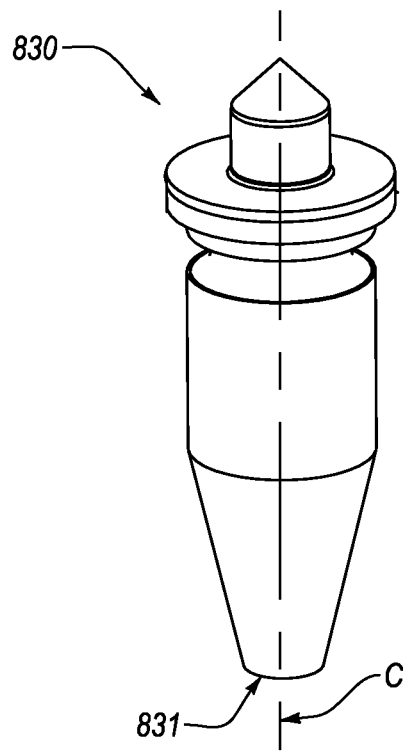
Figure 13:
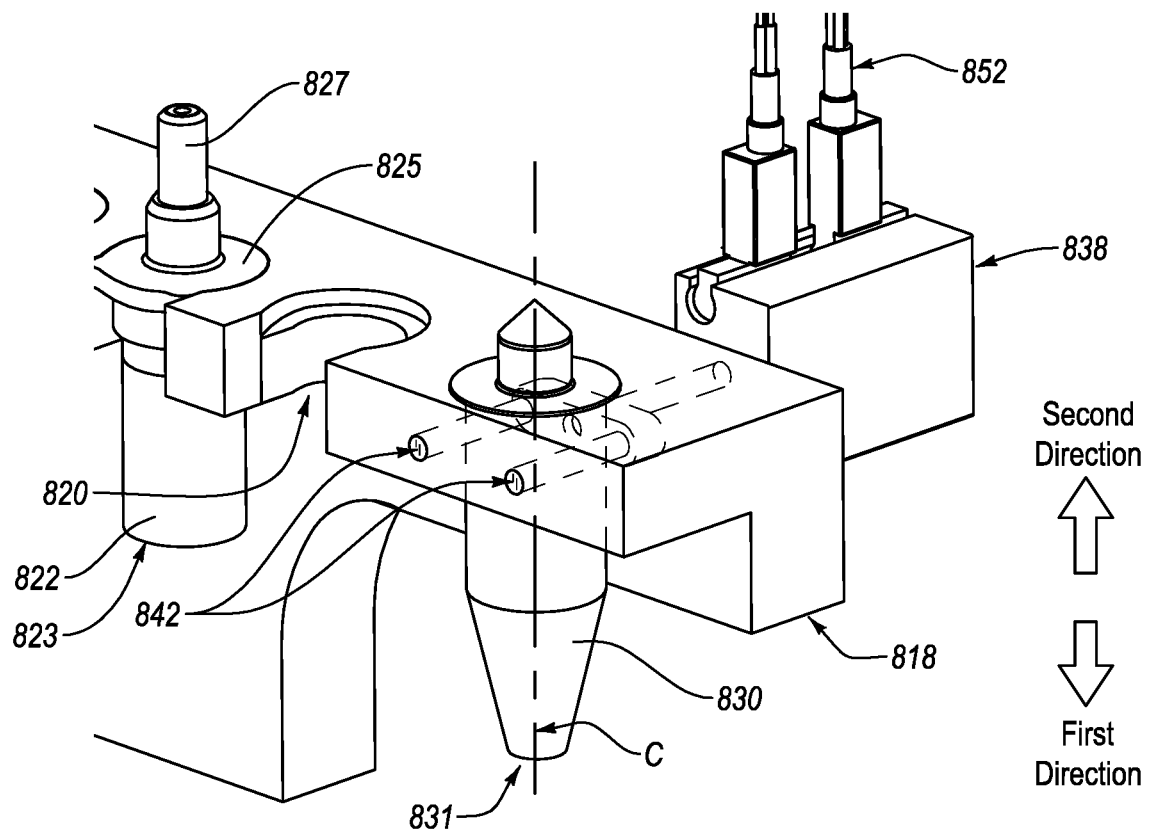
Figure 14:
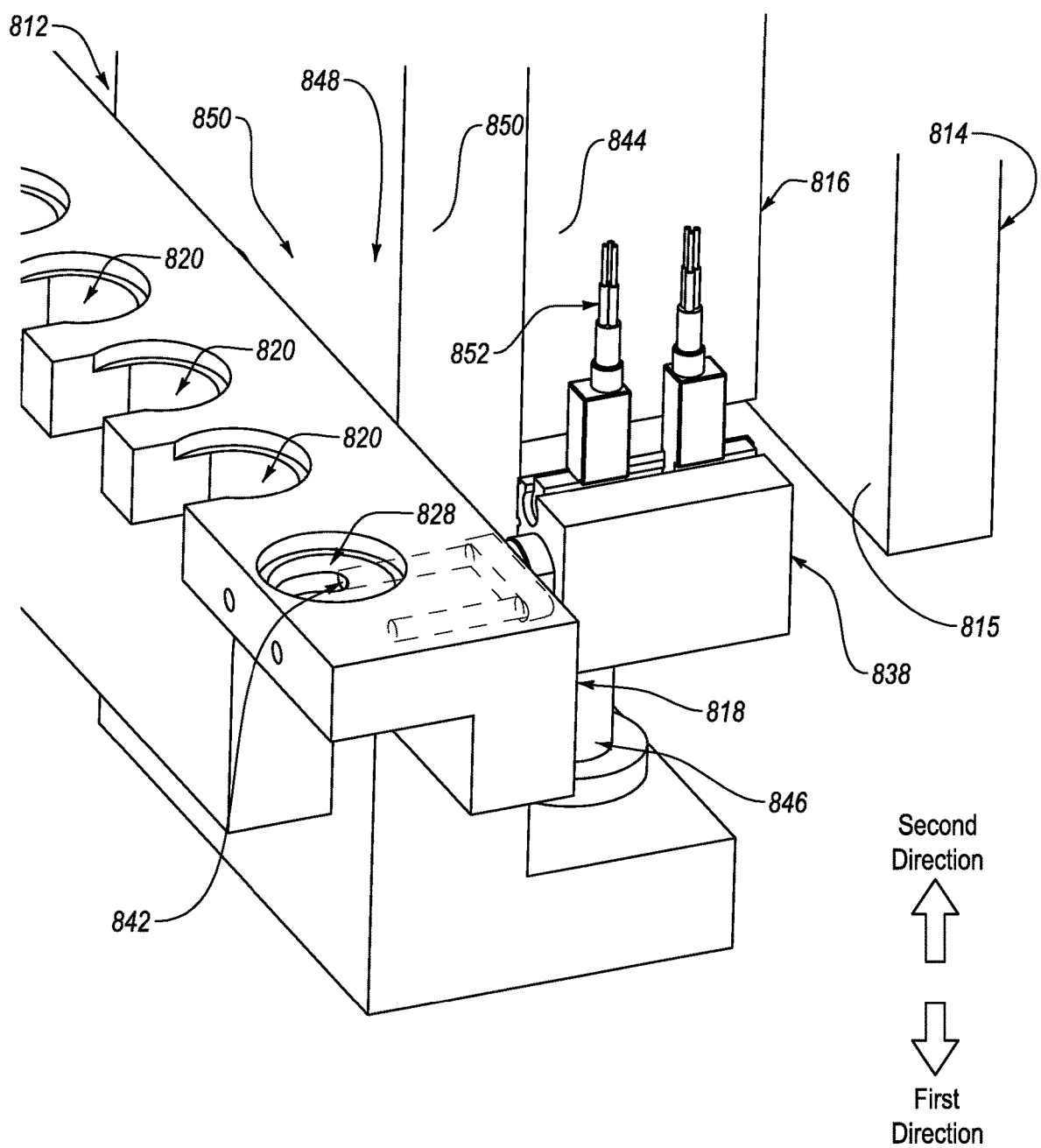
Figure 15:
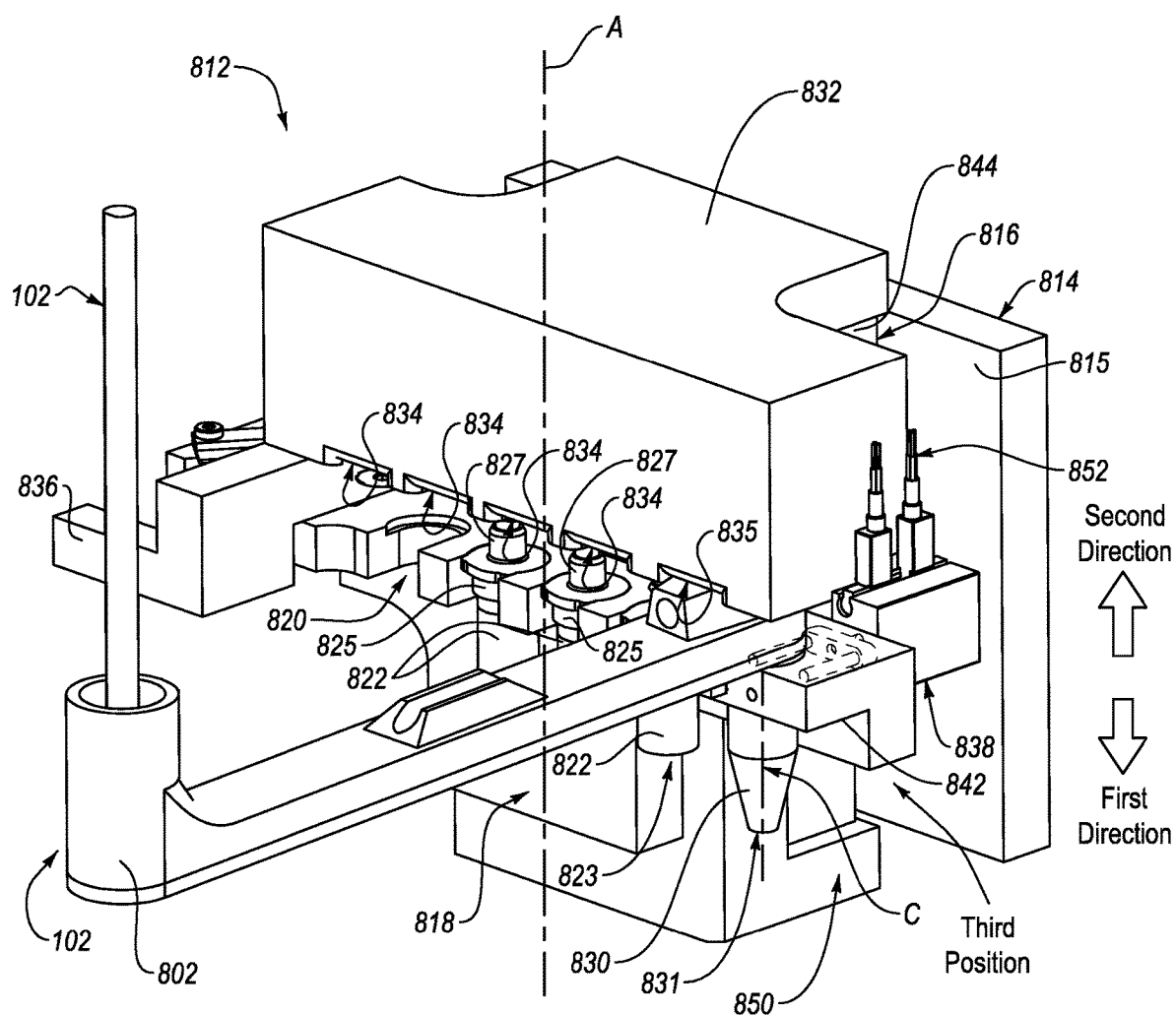
Figure 16:
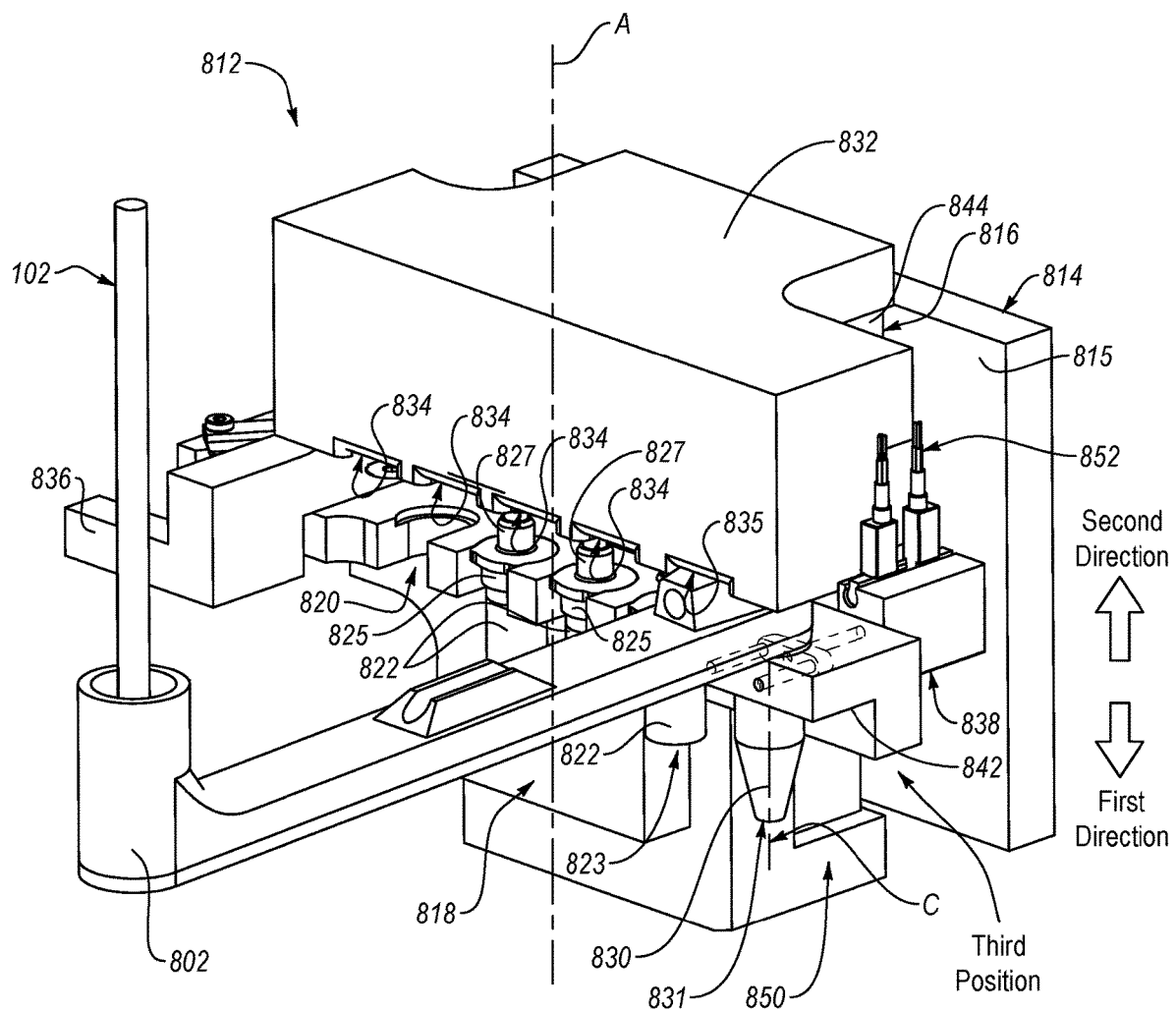
Figure 17:
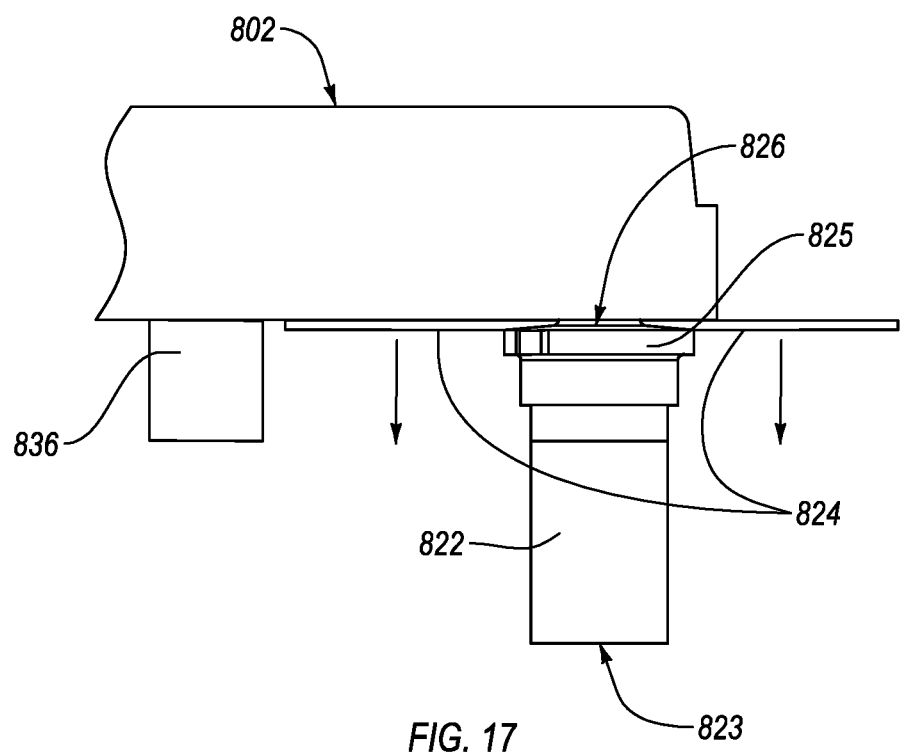
Figure 19:
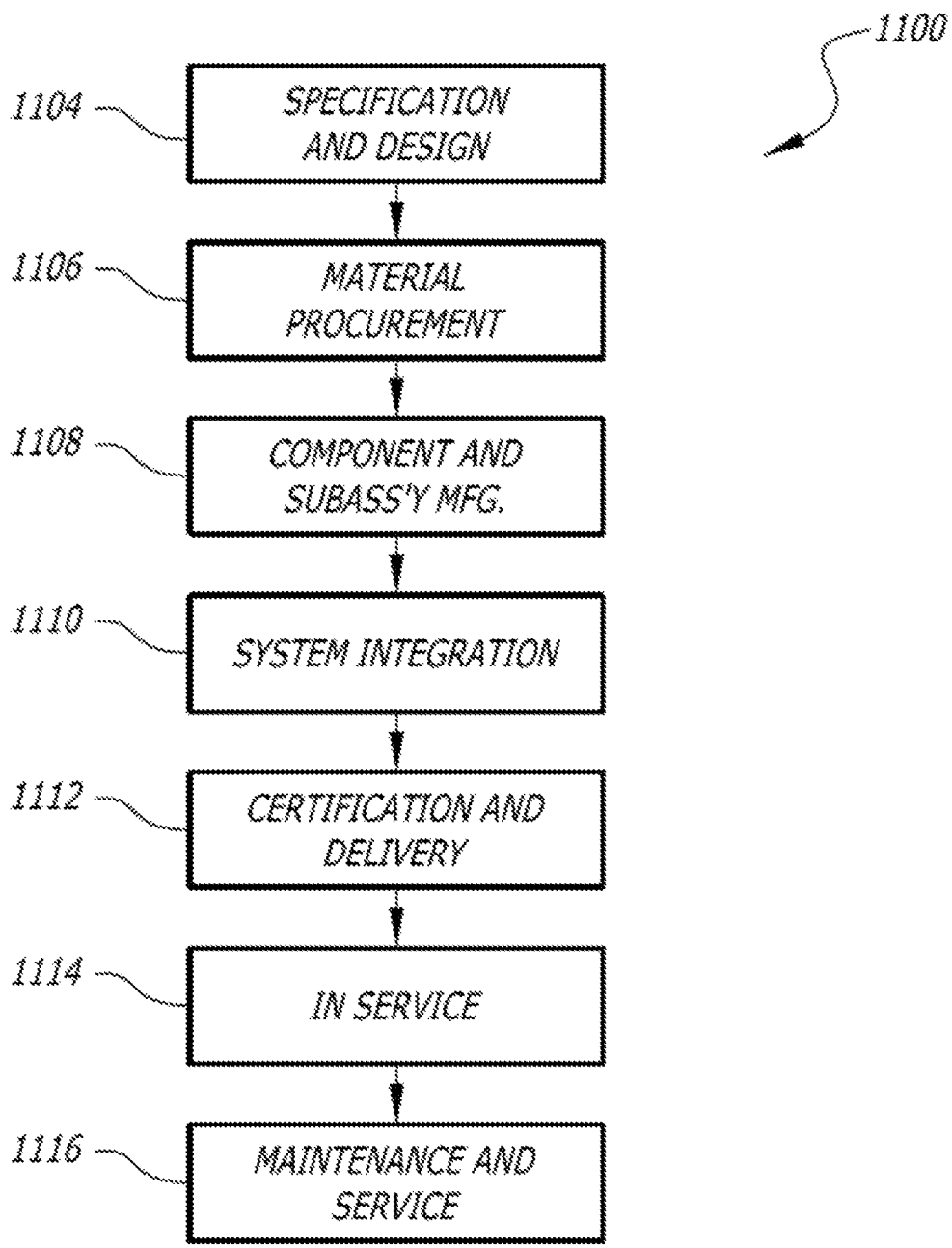

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of a system for loading and unloading a brush to and from a brush-arm assembly of an end-effector, according to one or more examples of the present disclosure;

FIG. 2 is a schematic, side elevation, view of an apparatus of the system of FIG. 1, according to one or more examples of the present disclosure;

FIG. 3 is a schematic, front view of the apparatus of FIG. 2, according to one or more examples of the present disclosure;

FIG. 4 is a schematic, perspective view of the apparatus of FIG. 2, according to one or more examples of the present disclosure;

FIG. 5 is a schematic, perspective view of the apparatus of FIG. 2, according to one or more examples of the present disclosure;

FIG. 6 is a schematic, front view of the apparatus of FIG. 2, according to one or more examples of the present disclosure;

FIG. 7 is a schematic, front view of the apparatus of FIG. 2, according to one or more examples of the present disclosure;

FIG. 8 is a schematic, front view of the apparatus of FIG. 2, according to one or more examples of the present disclosure;

FIG. 9 is a schematic, front view of the apparatus of FIG. 2, according to one or more examples of the present disclosure;

FIG. 10 is a schematic, perspective view of a detail of the apparatus of FIG. 2, according to one or more examples of the present disclosure;

FIG. 11 is a schematic, front view of the apparatus of FIG. 2, according to one or more examples of the present disclosure;

FIG. 12 is a schematic, perspective view of a calibration tool of the system of FIG. 1, according to one or more examples of the present disclosure;

FIG. 13 is a schematic, perspective view of a detail of the apparatus of FIG. 2 with the calibration tool of FIG. 12, according to one or more examples of the present disclosure;

FIG. 14 is a schematic, perspective view of a detail of the apparatus of FIG. 2, according to one or more examples of the present disclosure;

FIG. 15 is a schematic, perspective view of the apparatus of FIG. 2, according to one or more examples of the present disclosure;

FIG. 16 is a schematic, perspective view of the apparatus of FIG. 2, according to one or more examples of the present disclosure;

FIG. 17 is a schematic, side elevation view of a detail of the apparatus of FIG. 2, according to one or more examples of the present disclosure;

FIGS. 18A-18C collectively are a block diagram of a method of loading and unloading a brush to and from a brush-arm assembly of an end-effector, according to one or more examples of the present disclosure;

FIG. 19 is a block diagram of aircraft production and service methodology; and

Figure 20:
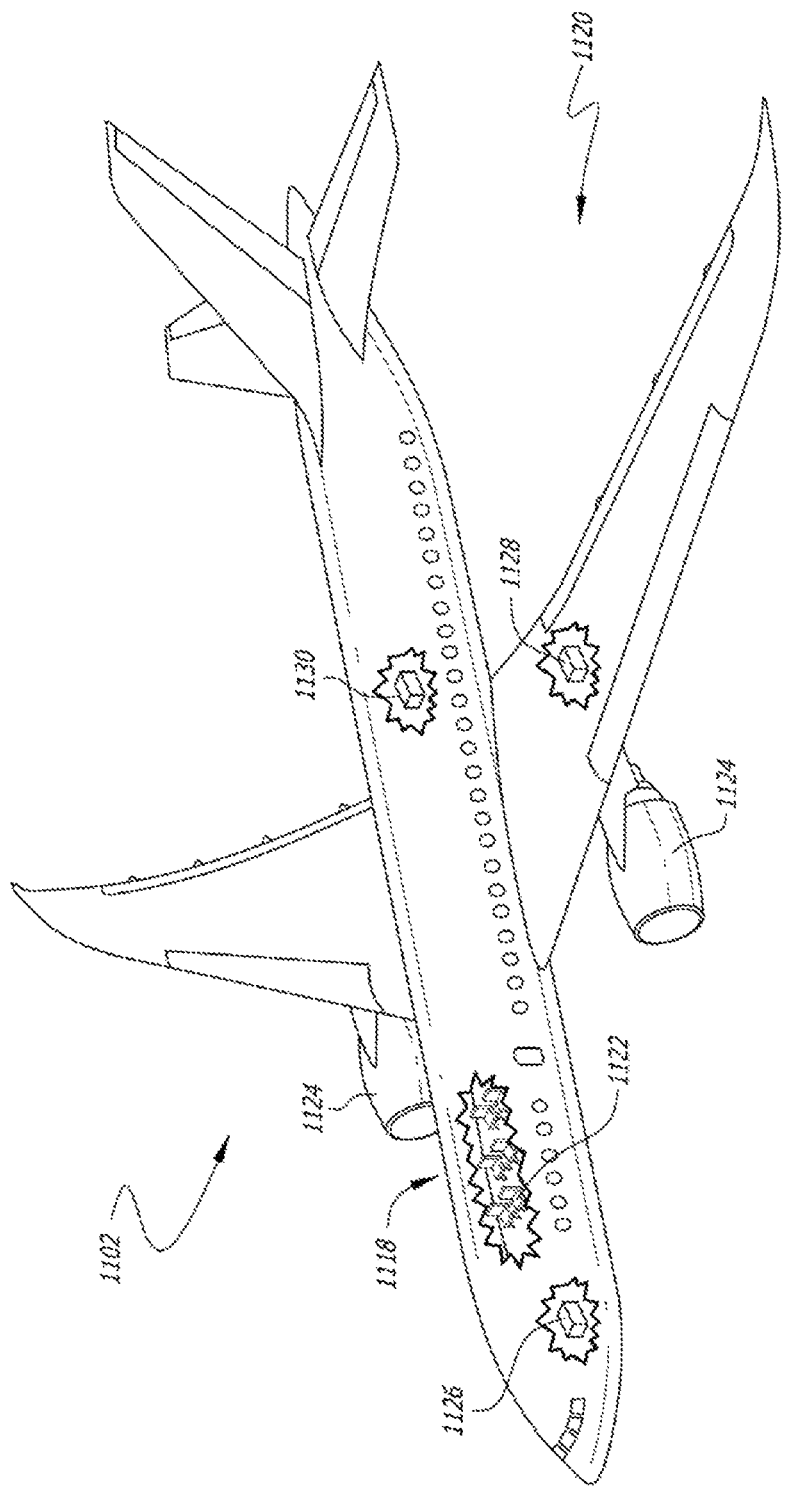

FIG. 20 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 18A-19, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 18A-19 and 18 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-11 and 13-16, apparatus 812 for loading and unloading brush 822 to and from brush-arm assembly 802 of end-effector 102 is disclosed. Apparatus 812 comprises base 814, defining base plane 815. Apparatus 812 also comprises carriage 818, movable along axis A at least to a first position, a second position, or a third position relative to base 814. The second position and the third position are different from the first position. Axis A is parallel to base plane 815. Carriage 818 comprises brush receptacle 820, configured to prevent movement of brush 822 relative to carriage 818 in a first direction, parallel to axis A, but not in a second direction, opposite to the first direction, when brush 822 is placed in brush receptacle 820. Additionally, apparatus 812 comprises stationary component 832, fixed relative to base 814 and configured to prevent movement of brush-arm assembly 802 of end-effector 102 relative to base 814 in the second direction. Apparatus 812 further comprises linear actuator 816, configured to move carriage 818 relative to base 814. The preceding subject matter of this paragraph characterizes example 1 of the present disclosure.

Use of end-effector 102 allows for automated application of glutinous substances using brush 822 loaded into brush-arm assembly 802. Use of base 814, that defines base plane 815, provides a supporting foundation and structure for the various components of apparatus 812 and keeps apparatus 812 secure while carriage 818 is moved into place to load and/or unload brush 822 to/from brush-arm assembly 802. Use of carriage 818 allows for reliable and efficient loading and unloading of brush 822 to/from brush-arm assembly 802 of end-effector 102 by moving along axis A that is parallel to base plane 815 in a first or a second direction between a first position, a second position, and a third position. Use of brush receptacle 820 provides a secure holding location for brush 822 until brush 822 is loaded into brush-arm assembly 802. Use of stationary component 832 prevents movement of brush-arm assembly when carriage 818 is moved into position to load brush 822 into brush-arm assembly 802. Use of linear actuator 816 allows carriage 818 to reliably move relative to base 814 to load and/or unload brush 822 to/from brush-arm assembly 802.

For example, linear actuator 816 may be controlled or otherwise activated to move carriage 818 between a plurality of different positions along axis A parallel to base plane 815. In a further example, brush receptacle 820 is coupled to carriage 818 such that as linear actuator 816 is controlled to move carriage 818 between a plurality of positions, brush receptacle 820 moves with carriage along the same axis A parallel to base plane 815. A plurality of brush receptacles 820, in another example, may be coupled to carriage 818 to secure a plurality of brushes 822, and may accommodate brushes 822 that have different shapes, sizes, types, or the like. In one example, stationary component 832 may be located opposite (e.g., directly above) brush receptacle 820 such that when linear actuator 816 moves carriage 818 to load brush 822 into brush-arm assembly 802, brush-arm assembly 802 is positioned against stationary component 832 so that brush-arm assembly 802 is prevented from moving while brush 822 is loaded into brush-arm assembly 802.

As a further example, linear actuator 816 may be a hydraulic actuator, a pneumatic actuator, an electric actuator, a mechanical actuator, or the like, or any combination of the foregoing. In another example, apparatus 812 may include a single linear actuator 816 or a plurality of linear actuators 816 that move carriage 818 along axis A.

End-effector 102 may be configured to be coupled to and manipulated by robot 806.

The first position may be a position where carriage 818 is located furthest from stationary component 832. The second position may be a position where carriage 818 is located in a brush-unloading position. The third position may be a position where carriage 818 is located in a brush-loading position.

Referring generally to FIG. 1 and particularly to, e.g., FIGS. 7, 9-10, and 15-16, the second position of carriage 818 relative to base 814 is identical to the third position of carriage 818 relative to base 814. The preceding subject matter of this paragraph characterizes example 2 of the present disclosure, wherein example 2 also includes the subject matter according to example 1, above.

Having the second and third positions be identical provides for convenient movement of carriage 818 to the second and/or third positions. For example, it may be easier and more convenient to control or program linear actuator 816 to move to the second and third positions if they are identical positions. Alternatively, the second and third positions may be different. The second and third positions may be determined based on a configuration of apparatus 812, or more particularly, the various components of apparatus 812. For example, the second position may be for loading brush 822 into brush-arm assembly 802, and the third position may be for unloading brush 822 from brush-arm assembly 802.

Referring generally to FIG. 1 and particularly to, e.g., FIGS. 3-11 and 13-16, brush receptacle 820 is circumferentially open. The preceding subject matter of this paragraph characterizes example 3 of the present disclosure, wherein example 3 also includes the subject matter according to any one of examples 1 to 2, above.

Providing a circumferentially open brush receptacle 820 allows for convenient placement, secure holding, and easy unloading of brushes 822 by sliding brush 822 into brush receptacle 820 instead of inserting brush 822 from the top of brush receptacle 820, which may be difficult if brush 822 is coated with glutinous substance 168.

Brush receptacle 820 may have various shapes, such as a square, star, diamond, oval, or the like to accommodate brushes 822 of various shapes.

Referring generally to FIG. 1 and particularly to, e.g., FIGS. 3-8, 11, and 17, carriage 818 further comprises two blades 824, opposing each other. Two blades 824 together define at least one plane, perpendicular to axis A. Additionally, two blades 824 are spaced apart to form gap 826 therebetween. The preceding subject matter of this paragraph characterizes example 4 of the present disclosure, wherein example 4 also includes the subject matter according to any one of examples 1 to 3, above.

Two blades 824 may allow for unloading or disengaging brush 822 from brush-arm assembly 802 when brush 822 is placed between two blades 824 and carriage 818 is moved in a first direction away from brush-arm assembly 802, from a second position to a first position.

Two blades 824 may be comprised of metal, plastic, or any rigid material that is strong enough to disengage brush 822 from brush-arm assembly 802 when carriage 818 is moved away from brush arm assembly 802.

Referring generally to FIG. 1 and particularly to, e.g., FIG. 5, gap 826, defined by two blades 824, converges toward base 814. The preceding subject matter of this paragraph characterizes example 5 of the present disclosure, wherein example 5 also includes the subject matter according to example 4, above.

Configuring two blades 824 such that gap 826 is formed that converges toward base 814 provides a tight fit on brush 822 loaded into brush-arm assembly 802 as it is placed within gap 826. In another example, by providing gap 826 that converges toward base 814 allows brushes 822 of various sizes to fit between two blades 824 to be unloaded from brush-arm assembly 802.

Referring generally to FIG. 1 and particularly to, e.g., FIG. 5, gap 826 has first symmetry axis B that is oblique to base plane 815. The preceding subject matter of this paragraph characterizes example 6 of the present disclosure, wherein example 6 also includes the subject matter according to example 5, above.

Use of symmetrical and oblique gap 826 allows brush 822 to be smoothly placed between two blades 824 and allows even force to be placed on each of two blades 824 when brush 822 is unloaded or disengaged from brush-arm assembly 802.

Referring generally to FIG. 1 and particularly to, e.g., FIGS. 2-6, 8-11, and 15-17, apparatus 812 further comprises tool-support arm 836, fixed relative to base 814 and configured to support brush-arm assembly 802 of end-effector 102 to prevent movement of brush-arm assembly 802 in the first direction when carriage 818 is moved in the first direction away from tool-support arm 836 to disengage brush 822 from brush-arm assembly 802 using two blades 824. The preceding subject matter of this paragraph characterizes example 7 of the present disclosure, wherein example 7 also includes the subject matter according to any one of examples 4 to 6, above.

Use of tool-support arm 836 that is fixed relative to base 814 provides support for brush-arm assembly 802 when brush 822 is being unloaded or disengaged from brush-arm assembly 802. For example, when disengaging brush 822 from brush-arm assembly 802, brush 822 may be placed within gap 826 between two blades 824 and brush-arm assembly 802 may be positioned on top of tool-support arm 836 such that when force is placed on brush-arm assembly 802 responsive to carriage 818 being moved away in the first direction from brush-arm assembly 802 to disengage brush 822 from brush-arm assembly 802, brush-arm assembly 802 is supported by tool-support arm 836 to prevent movement of brush-arm assembly 802 in the first direction.

Referring generally to FIG. 1 and particularly to, e.g., FIGS. 3-16, carriage 818 further comprises tool receptacle 828, configured to prevent movement of calibration tool 830 relative to carriage 818 in the first direction, but not in the second direction, when calibration tool 830 is placed in tool receptacle 828. The preceding subject matter of this paragraph characterizes example 8 of the present disclosure, wherein example 8 also includes the subject matter according to any one of examples 1 to 7, above.

Use of tool receptacle 828 allows calibration tool 830 to be secured to carriage 818 while carriage 818 moves along axis A parallel to base 814. Tool receptacle 828 may allow calibration tool 830 to be removed from tool receptacle 828 in a second direction, for example, when calibration tool 830 is loaded into brush-arm assembly 802. Calibration tool 830, when loaded into brush-arm assembly 802, may help calibrate brush-arm assembly 802, end-effector 102, controller 810, robot 806, and/or the like to determine a location of an access point of brush-arm assembly 802 for loading brush 822, located in brush receptacle 820, or more particularly, to load shank 827 of brush 822, into the access point of brush-arm assembly 802.

Referring generally to FIG. 1 and particularly to, e.g., FIGS. 3-11 and 14, tool receptacle 828 is circumferentially closed. The preceding subject matter of this paragraph characterizes example 9 of the present disclosure, wherein example 9 also includes the subject matter according to example 8, above.

Use of a circumferentially closed tool receptacle 828 secures calibration tool 830 within tool receptacle 828, and allows calibration tool 830 to be easily inserted into tool receptacle 828. Calibration tool 830, for example, may be directly inserted into the top of tool receptacle 828, and the circumferentially closed opening of tool receptacle 828 ensures that calibration tool 830 remains secure while carriage 818 moves along axis A.

Referring generally to FIG. 1 and particularly to, e.g., FIGS. 2-3, 6-9, 11, and 13-16, apparatus 812 further comprises second linear actuator 838, coupled to carriage 818 and configured to selectively prevent removal of calibration tool 830 from tool receptacle 828. The preceding subject matter of this paragraph characterizes example 10 of the present disclosure, wherein example 10 also includes the subject matter according to example 9, above.

Use of second linear actuator 838 provides another mechanism for securing calibration tool 830 within tool receptacle 828. For example, second linear actuator 838 may actuate one or more pins, or other mechanisms, for securing calibration tool 830 within tool receptacle 828.

In another example, after calibration, calibration tool 830 may be placed within tool receptacle 828 while loaded into brush-arm assembly 802. Second linear actuator 838 may actuate a securing mechanism for securing calibration tool 830 within tool receptacle 828. Carriage 818 may then be moved in a first direction away from brush-arm assembly 802 to disengage calibration tool 830 from brush-arm assembly 802. Second linear actuator may 838 may be a hydraulic actuator, a pneumatic actuator, an electric actuator, a mechanical actuator, or the like, or any combination of the foregoing.

Referring generally to FIG. 1 and particularly to, e.g., FIGS. 2, 5, and 13-16, second linear actuator 838 comprises pin 842, selectively movable into locking engagement with calibration tool 830. The preceding subject matter of this paragraph characterizes example 11 of the present disclosure, wherein example 11 also includes the subject matter according to example 10, above.

Using pin 842 that is selectively movable into locking engagement with calibration tool 830 secures calibration tool 830 within tool receptacle 828. For example, when calibration tool 830 is located within tool receptacle 828, second linear actuator 838 may actuate pin 842 to lock calibration tool 830 within tool receptacle 828.

Second linear actuator 838 may comprise a plurality of pins 842 that lock calibration tool 830 within tool receptacle 828. For example, second linear actuator 838 may actuate a pair (or more) of pins 842 that lock calibration tool 830 within tool receptacle 828. Pins 842 may slide into locking engagement with calibration tool 830 within a groove between a head and a body of calibration tool 830 when calibration tool 830 is in tool receptacle 828.

Referring generally to FIG. 1 and particularly to, e.g., FIGS. 2-4, 6-9, 11, and 13-16, second linear actuator 838 further comprises position sensor 852, configured to determine whether pin 842 is in locking engagement with calibration tool 830. The preceding subject matter of this paragraph characterizes example 12 of the present disclosure, wherein example 12 also includes the subject matter according to example 11, above.

Use of position sensor 852 provides for reliable automated determination of a position of pin 842. Position sensor 852, for example, may provide feedback to second linear actuator 838, controller 810, or the like to indicate whether pin 842 is in locking engagement with calibration tool 830. Based on the feedback, second linear actuator 838 and/or controller 810 can determine whether to actuate pin 842 to lock or unlock calibration tool 830 depending on whether calibration tool 830 is being loading into brush-arm assembly 802 or disengaged from brush-arm assembly.

Position sensor 852, for example, may comprise a proximity sensor, a capacitance sensor, an infrared sensor, or the like that can determine a position of pin 842, e.g., whether pin 842 is in locking or disengagement position, relative to calibration tool 830 and/or tool receptacle 828. Position sensor 852 may send a signal to controller 810, which may control second linear actuator 838 to actuate pin 842 in locking engagement or in disengagement position based on the received signal. Alternatively, or additionally, position sensor 852 may send a signal directly to second linear actuator 838 to actuate pin 842 in locking engagement or in disengagement position based on the received signal.

Pin 842 may be made of a substantially rigid material, e.g. metal, plastic, or the like, and may be sized to slide into locking engagement with calibration tool 830 within a groove between a head and a body of calibration tool 830 when calibration tool 830 is in tool receptacle 828.

Referring generally to FIG. 1 and particularly to, e.g., FIGS. 3-11 and 15-16, stationary component 832 further comprises slot 834, complementary in shape to a portion of brush-arm assembly 802 of end-effector 102. The preceding subject matter of this paragraph characterizes example 13 of the present disclosure, wherein example 13 also includes the subject matter according to any one of examples 8 to 12, above.

Use of slot 834 allows for secure placement of brush-arm assembly 802 while brush 822 is loaded into brush-arm assembly 802 or while location of brush-arm assembly 802 is being calibrated. Slot 834 may be shaped to complement at least a portion of brush-arm assembly 802. For example, as illustrated in FIGS. 4 and 5, slot 834 may have a shape that complements a top portion of brush-arm assembly 802 such that brush-arm assembly 802 securely fits within slot 834. Slot 834 may be shaped to complement various shapes of brush-arm assembly 802, such as square, rectangle, oval, or the like.

Referring generally to FIG. 1 and particularly to, e.g., FIGS. 3-11 and 15-16, slot 834 of stationary component 832 is aligned with brush receptacle 820 of carriage 818 along a second axis, coincident with or parallel to axis A. The preceding subject matter of this paragraph characterizes example 14 of the present disclosure, wherein example 14 also includes the subject matter according to example 13, above.

Aligning slot 834 with brush receptacle 820 along a second axis coincident with axis A allows brush-arm assembly 802, when placed within slot 834, to be aligned with brush 822 so that brush 822 can be loaded into brush-arm assembly 802 when carriage 818 is moved from a first position to a third position.

Referring generally to FIG. 1 and particularly to, e.g., FIGS. 3-11 and 15-16, stationary component 832 further comprises second slot 835, complementary in shape to the portion of brush-arm assembly 802 of end-effector 102. The preceding subject matter of this paragraph characterizes example 15 of the present disclosure, wherein example 15 also includes the subject matter according to example 14, above.

Use of second slot 835 allows for secure placement of brush-arm assembly 802 while calibration tool 830 is loaded into brush-arm assembly 802. Second slot 835 may be shaped to complement at least a portion of brush-arm assembly 802. For example, as illustrated in FIGS. 4 and 5, second slot 835 may have a shape that complements a top portion of brush-arm assembly 802 such that brush-arm assembly 802 securely fits within second slot 835. Second slot 835 may be shaped to complement various shapes of brush-arm assembly 802, such as square, rectangle, oval, or the like.

Referring generally to FIG. 1 and particularly to, e.g., FIGS. 3-11 and 15-16, second slot 835 of stationary component 832 is aligned with tool receptacle 828 of carriage 818 along a third axis, coincident with or parallel to axis A. The preceding subject matter of this paragraph characterizes example 16 of the present disclosure, wherein example 16 also includes the subject matter according to example 15, above.

Use of second slot 835 aligned with tool receptacle 828 along the third axis coincident with axis A allows brush-arm assembly 802, when placed within second slot 835, to be aligned with calibration tool 830 so that calibration tool 830 can be loaded into brush-arm assembly 802 when carriage 818 is moved from a first position to a third position.

Referring generally to FIG. 1 and particularly to, e.g., FIGS. 2-11 and 14-16, apparatus 812 further comprises slider 850, movable relative to base 814 along axis A. Carriage 818 is fixed to slider 850. The preceding subject matter of this paragraph characterizes example 17 of the present disclosure, wherein example 17 also includes the subject matter according to any one of examples 1 to 16, above.

Slider 850 allows carriage 818, which is coupled to slider 850, to easily and smoothly move along axis A relative to base 814. For example, slider 850 may allow carriage 818 to move in a first or second direction from/to a first position to/from a second and/or third position.

Referring generally to FIG. 1 and particularly to, e.g., FIGS. 2 and 14, linear actuator 816 comprises piston 846, coupled to slider 850. Piston 846 of linear actuator 816 is movable along axis A to translate carriage 818 at least to the first position, the second position, or the third position relative to base 814. The preceding subject matter of this paragraph characterizes example 18 of the present disclosure, wherein example 18 also includes the subject matter according to example 17, above.

Use of piston 846 provides for smooth and reliable movement of slider 850 along axis A responsive to linear actuator 816 actuating slider 850 to move carriage 818 in a first or second direction from/to a first position to/from a second and/or third position.

Referring generally to FIG. 1 and particularly to, e.g., FIGS. 2-11 and 14-16, linear actuator 816 further comprises cylinder body 844, fixed to base 814. Piston 846 is movable relative to cylinder body 844. The preceding subject matter of this paragraph characterizes example 19 of the present disclosure, wherein example 19 also includes the subject matter according to example 18, above.

Use of cylinder body 844, fixed to base, provides for reliable movement of piston 846 along axis A relative to base 814. Cylinder body 844 may provide lubrication, or the like, for piston 846 to maintain smooth and reliable movement of piston relative to cylinder body 844.

Referring generally to FIG. 1 and particularly to, e.g., FIGS. 2-4, 6, 8-9, 11, and 14, apparatus 812 further comprises rail 848, fixed to cylinder body 844. Slider 850 is movably coupled to rail 848. The preceding subject matter of this paragraph characterizes example 20 of the present disclosure, wherein example 20 also includes the subject matter according to example 19, above.

Use of rail 848 provides for reliable and smooth movement of slider 850 along axis A relative to base 814 responsive to linear actuator 816 actuating piston 846 to move slider 850, and carriage 818, in a first or second direction.

Referring generally to FIG. 1 and particularly to, e.g., FIGS. 2-11 and 13-16, system 100 for applying glutinous substance 168 to work piece 170 using brush 822, having brush tip 823, is disclosed. System 100 comprises brush-arm assembly 802. System 100 also comprises robot 806, configured to manipulate end-effector 102. Additionally, system 100 comprises apparatus 812 that comprises base 814, defining base plane 815. Apparatus 812 also comprises carriage 818, movable along axis A at least to a first position, a second position, or a third position relative to base 814. The second position and the third position are different from the first position. Axis A is parallel to base plane 815. Carriage 818 comprises brush receptacle 820, configured to prevent movement of brush 822 relative to carriage 818 in a first direction, parallel to axis A, but not in a second direction, opposite to the first direction, when brush 822 is placed in brush receptacle 820. Apparatus 812 further comprises stationary component 832, fixed to base 814 and configured to engage end-effector 102 to prevent movement of end-effector 102 relative to base 814 in the second direction. Apparatus 812 also comprises linear actuator 816, configured to move carriage 818 relative to base 814. System 100 further comprises controller 810, operatively coupled with at least one of robot 806 or apparatus 812. The preceding subject matter of this paragraph characterizes example 21 of the present disclosure.

Use of end-effector 102 allows for automated application of glutinous substances using brush 822 loaded into brush-arm assembly 802. Use of robot 806, controlled by controller 810, provides automated control of end-effector 102, including brush-arm assembly 802 and apparatus 812. Use of base 814, that defines base plane 815, provides a supporting foundation and structure for the various components of apparatus 812 and keeps apparatus 812 secure while carriage 818 is moved into place to load and/or unload brush 822 to/from brush-arm assembly 802. Use of carriage 818 allows for reliable and efficient loading and unloading of brush 822 to/from brush-arm assembly 802 of end-effector 102 by moving along axis A that is parallel to base plane 815 in a first or a second direction between a first position, a second position, and a third position. Use of brush receptacle 820 provides a secure holding location for brush 822 until brush 822 is loaded into brush-arm assembly 802. Use of stationary component 832 prevents movement of brush-arm assembly 802 when carriage 818 is moved into position to load brush 822 into brush-arm assembly 802. Use of linear actuator 816 allows carriage 818 to reliably move relative to base 814 to load and/or unload brush 822 to/from brush-arm assembly 802.

For example, controller 810 may control linear actuator 816 to move carriage 818 between a plurality of different positions along axis A parallel to base plane 815. In a further example, brush receptacle 820 is coupled to carriage 818 such that as linear actuator 816 is controlled to move carriage 818 between a plurality of positions, brush receptacle 820 moves with carriage along the same axis A parallel to base plane 815. A plurality of brush receptacles 820, in another example, may be coupled to carriage 818 to secure a plurality of brushes 822, and may accommodate brushes 822 that have different shapes, sizes, types, or the like. In one example, stationary component 832 may be located opposite (e.g., directly above) brush receptacle 820 such that when linear actuator 816 moves carriage 818 to load brush 822 into brush-arm assembly 802, robot 806 positions brush-arm assembly 802 against stationary component 832 so that brush-arm assembly 802 is prevented from moving while brush 822 is loaded into brush-arm assembly 802.

As a further example, linear actuator 816 may be a hydraulic actuator, a pneumatic actuator, an electric actuator, a mechanical actuator, or the like, or any combination of the foregoing. In another example, apparatus 812 may include a single linear actuator 816 or a plurality of linear actuators 816 that move carriage 818 along axis A.

The first position may be a position where carriage 818 is located furthest from stationary component 832. The second position may be a position where carriage 818 is located in a brush-unloading position. The third position may be a position where carriage 818 is located in a brush-loading position.

Referring generally to, e.g., FIG. 1 and particularly to FIGS. 7, 9-10, and 15-16, second position of carriage 818 relative to base 814 is identical to the third position of carriage 818 relative to base 814. The preceding subject matter of this paragraph characterizes example 22 of the present disclosure, wherein example 22 also includes the subject matter according to example 21, above.

Having the second and third positions be identical provides for convenient movement of carriage 818 to the second and/or third positions. For example, it may be easier and more convenient to control or program linear actuator 816 to move to the second and third positions if they are identical positions. Alternatively, the second and third positions may be different. The second and third positions may be determined based on a configuration of apparatus 812, or more particularly, the various components of apparatus 812. For example, the second position may be for loading brush 822 into brush-arm assembly 802, and the third position may be for unloading brush 822 from brush-arm assembly 802.

Referring generally to, e.g., FIG. 1, and particularly to FIGS. 3-16, system 100 further comprises vision system 808, configured to determine parameters, comprising at least an orientation of second symmetry axis C of calibration tool 830, loaded onto brush-arm assembly 802 of end-effector 102, relative to brush-arm assembly 802, and further configured to generate an output of the parameters. Carriage 818 further comprises tool receptacle 828, configured to prevent movement of calibration tool 830 relative to carriage 818 in the first direction, but not in the second direction, when calibration tool 830 is placed in tool receptacle 828. Calibration tool 830 comprises tool tip 831. Controller 810 is operatively coupled with vision system 808 to receive output of the parameters from vision system 808. At least one of robot 806 or apparatus 812 is controlled by controller 810 based on the parameters received by controller 810 from vision system 808. The preceding subject matter of this paragraph characterizes example 23 of the present disclosure, wherein example 23 also includes the subject matter according to any one of examples 21 to 22, above.

Use of vision system 808 allows for automated calibration of brush-arm assembly 802. For example, vision system 808 may determine parameters, such as an orientation of symmetry axis C of calibration tool 830 loaded onto brush-arm assembly 802 relative to brush-arm assembly 802, used to calibrate brush-arm assembly 802. In a further example, vision system 808 may generate an output of the parameters, which may be sent to controller 810 and used to control apparatus 812, brush-arm assembly 802, and/or robot 806.

Vision system 808 may comprise one or more cameras, sensors, or other imaging or monitoring components for determining calibration parameters associated with calibration tool 830.

Use of tool receptacle 828 allows calibration tool 830 to be secured to carriage 818 while carriage 818 moves along axis A parallel to base 814. Tool receptacle 828 facilitates removal of calibration tool 830 from tool receptacle 828 in a second direction, for example, when calibration tool 830 is loaded into brush-arm assembly 802. Calibration tool 830, when loaded into brush-arm assembly 802, may help calibrate brush-arm assembly 802, end-effector 102, controller 810, robot 806, and/or the like to determine a location of an access point of brush-arm assembly 802 for loading brush 822, located in brush receptacle 820, or more particularly, to load shank 827 of brush 822, into the access point of brush-arm assembly 802

Referring generally to, e.g., FIG. 1, and particularly to FIGS. 12-13, the parameters further comprise a first offset of tool tip 831 of calibration tool 830, loaded onto brush-arm assembly 802 of end-effector 102, relative to brush-arm assembly 802. The preceding subject matter of this paragraph characterizes example 24 of the present disclosure, wherein example 24 also includes the subject matter according to example 23, above.

Determining a first offset of tool tip 831 of calibration tool 830 relative to brush-arm assembly 802 provides for automated and accurate calibration of brush-arm assembly 802.

Referring generally to, e.g., FIG. 1 and particularly to FIGS. 5-11, 13, and 15-17, controller 810 is configured to determine a second offset of brush tip 823, loaded onto brush-arm assembly 802 of end-effector 102, relative to brush-arm assembly 802, by one of adding or subtracting an archived value corresponding to a difference between the first offset of tool tip 831 of calibration tool 830 and the second offset of brush tip 823 to or from, respectively, the first offset of tool tip 831 of calibration tool 830. The preceding subject matter of this paragraph characterizes example 25 of the present disclosure, wherein example 25 also includes the subject matter according to example 24, above.

Determining a second offset of brush tip 823 of brush 822 loaded onto brush-arm assembly 802 provides for automated and accurate calibration of brush-arm assembly 802. For example, controller 810 may determine a second offset of brush tip 823 by adding or subtracting an archived value corresponding to a difference between the first offset of tool tip 831 of calibration tool 830 and the second offset of brush tip 823 to/from the first offset of tool tip 831 of calibration tool 830.

Referring generally to, e.g., FIG. 1 and particularly to FIGS. 5-11, 13, and 15-17, the parameters further comprise a second offset of brush tip 823 of brush 822 that is loaded onto brush-arm assembly 802 of end-effector 102, relative to brush-arm assembly 802. The preceding subject matter of this paragraph characterizes example 26 of the present disclosure, wherein example 26 also includes the subject matter according to example 23, above.

Determining a second offset of brush tip 823 of brush 822 loaded onto brush-arm assembly 802 provides for automated and accurate calibration of brush-arm assembly 802.

Referring generally to, e.g., FIGS. 1-11 and 17 and particularly to FIG. 18A, method 900 of manipulating brush 822 relative to brush-arm assembly 802 of end-effector 102, is disclosed. Method 900 comprises (block 902) locating carriage 818, comprising brush receptacle 820, in one of a first position or a second position relative to stationary component 832. Carriage 818 is selectively movable relative to stationary component 832 along axis A. Method 900 also comprises (block 904), with carriage 818 in one of the first position or the second position, different from the first position, relative to stationary component 832, locating brush-arm assembly 802 of end-effector 102 with respect to stationary component 832 so that brush-arm assembly 802 is in contact with stationary component 832. Additionally, method 900 comprises (block 906) moving carriage 818 in a second direction along axis A toward stationary component 832, from the first position to a third position, to load brush 822 onto brush-arm assembly 802 of end-effector 102, or moving carriage 818 in a first direction along axis A away from stationary component 832 from the second position to the first position to unload brush 822 from brush-arm assembly 802. The preceding subject matter of this paragraph characterizes example 27 of the present disclosure.

Use of end-effector 102 allows for automated application of glutinous substances using brush 822 loaded into brush-arm assembly 802. Use of base 814, that defines base plane 815, provides a supporting foundation and structure for the various components used to perform method (900) and secures the components while carriage 818 is moved into place to load and/or unload brush 822 to/from brush-arm assembly 802. Use of carriage 818 allows for reliable and efficient loading and unloading of brush 822 to/from brush-arm assembly 802 of end-effector 102 by moving along axis A that is parallel to base plane 815 in a first or a second direction between a first position, a second position, and a third position. Use of brush receptacle 820 provides a secure holding location for brush 822 until brush 822 is loaded into brush-arm assembly 802. Use of stationary component 832 prevents movement of brush-arm assembly when carriage 818 is moved into position to load brush 822 into brush-arm assembly 802.

Linear actuator 816 may move carriage 818 relative to base 814 to load and/or unload brush 822 to/from brush-arm assembly 802. For example, linear actuator 816 may be controlled or otherwise activated to move carriage 818 between a plurality of different positions along axis A parallel to base plane 815. In a further example, brush receptacle 820 is coupled to carriage 818 such that as linear actuator 816 is controlled to move carriage 818 between a plurality of positions, brush receptacle 820 moves with carriage along the same axis A, parallel to base plane 815. A plurality of brush receptacles 820, in another example, may be coupled to carriage 818 to secure a plurality of brushes 822, and may accommodate brushes 822 that have different shapes, sizes, types, or the like. In one example, stationary component 832 may be located opposite (e.g., directly above) brush receptacle 820 such that when linear actuator 816 moves carriage 818 to load brush 822 into brush-arm assembly 802, brush-arm assembly 802 is positioned against stationary component 832 so that brush-arm assembly 802 is prevented from moving while brush 822 is loaded into brush-arm assembly 802.

As a further example, linear actuator 816 may be a hydraulic actuator, a pneumatic actuator, an electric actuator, a mechanical actuator, or the like, or any combination of the foregoing. In another example, carriage 818 may be moved by a single linear actuator, such as linear actuator 816, or a plurality of linear actuators that move carriage 818 along axis A.

The first position may be a position where carriage 818 is located furthest from stationary component 832. The second position may be a position where carriage 818 is located in a brush-unloading position. The third position may be a position where carriage 818 is located in a brush-loading position.

Referring generally to, e.g., FIGS. 7, 9-10, and 15-16 and particularly to FIG. 18A, according to method 900, (block 908) second position of carriage 818 relative to stationary component 832 is identical to the third position of carriage 818 relative to stationary component 832. The preceding subject matter of this paragraph characterizes example 28 of the present disclosure, wherein example 28 also includes the subject matter according to example 27, above.

Having the second and third positions be identical provides for convenient movement of carriage 818 to the second and/or third positions. For example, it may be easier and more convenient to control or program linear actuator 816 to move to the second and third positions if they are identical positions. Alternatively, the second and third positions may be different. The second and third positions may be determined based on a configuration of apparatus 812, or more particularly, the various components of apparatus 812 used to perform method (900). For example, the second position may be for loading brush 822 into brush-arm assembly 802, and the third position may be for unloading brush 822 from brush-arm assembly 802.

Referring generally to, e.g., FIGS. 1-11 and 17 and particularly to FIG. 18A, according to method 900, (block 910) when carriage 818 is in the first position relative to stationary component 832, locating brush-arm assembly 802 of end-effector 102 with respect to stationary component 832, such that brush-arm assembly 802 is in contact with stationary component 832, comprises mating brush-arm assembly 802 with slot 834 of stationary component 832. Slot 834 of stationary component 832 is aligned with brush receptacle 820, which contains brush 822, along a second axis, coincident with or parallel to axis A. The preceding subject matter of this paragraph characterizes example 29 of the present disclosure, wherein example 29 also includes the subject matter according to any one of examples 27 to 28, above.

Use of slot 834 allows for secure placement of brush-arm assembly 802 while brush 822 is loaded into brush-arm assembly 802. Slot 834 may be shaped to complement at least a portion of brush-arm assembly 802. For example, slot 834 may have a shape that complements a top portion of brush-arm assembly 802 such that brush-arm assembly 802 securely fits within slot 834. Slot 834 may be shaped to complement various shapes of brush-arm assembly 802, such as square, rectangle, oval, or the like.

Aligning slot 834 with brush receptacle 820 along a second axis coincident with axis A allows brush-arm assembly 802, when placed within slot 834, to be aligned with brush 822 so that brush 822 can be loaded into brush-arm assembly 802 when carriage 818 is moved from a first position to a third position.

Referring generally to, e.g., FIGS. 1 and 3-8 and particularly to FIG. 18A, method 900 further comprises, (block 912) with carriage 818 in the first position relative to stationary component 832 and brush-arm assembly 802 of end-effector 102 mated with slot 834 of stationary component 832, loading brush 822, located in brush receptacle 820 of carriage 818, onto brush-arm assembly 802 of end-effector 102 by selectively moving carriage 818 in the second direction relative to stationary component 832 from the first position to the third position. The preceding subject matter of this paragraph characterizes example 30 of the present disclosure, wherein example 30 also includes the subject matter according to example 29, above.

Loading brush 822 onto brush-arm assembly 802 allows for the use of brush 822 by end effector 102. For example, brush 822 may include glutinous substance 168 on brush tip 823 that can be applied by end-effector 102 when brush 822 is loaded onto brush-arm assembly 802.

Referring generally to, e.g., FIGS. 1, 9-11, and 17 and particularly to FIG. 18A, method 900 further comprises, (block 914) with carriage 818 in the second position and brush 822 loaded onto brush-arm assembly 802 of end-effector 102, selectively moving carriage 818 relative to stationary component 832 and brush-arm assembly 802, in the first direction, into the first position to remove brush 822 from brush receptacle 820. The preceding subject matter of this paragraph characterizes example 31 of the present disclosure, wherein example 31 also includes the subject matter according to any one of examples 27 to 30, above.

Removing brush 822 from brush-arm assembly 802 allows for disposal, for example, of a used brush 822 and prepares brush-arm assembly 802 to be loaded with a different brush 822.

Referring generally to, e.g., FIGS. 1-11, and 15-17 and particularly to FIG. 18B, according to method 900, (block 916) when carriage 818 is in the second position relative to stationary component 832, locating brush-arm assembly 802 of end-effector 102 with respect to stationary component 832 so that brush-arm assembly 802 is in contact with stationary component 832 comprises resting brush-arm assembly 802 on tool-support arm 836, fixed relative to stationary component 832. The preceding subject matter of this paragraph characterizes example 32 of the present disclosure, wherein example 32 also includes the subject matter according to any one of examples 27 to 28, above.

Use of tool-support arm 836 that is fixed relative to stationary component 832 provides support for brush-arm assembly 802 when brush 822 is being unloaded or disengaged from brush-arm assembly 802. For example, when disengaging brush 822 from brush-arm assembly 802, brush-arm assembly 802 may be positioned on top of tool-support arm 836 such that when force is placed on brush-arm assembly 802 responsive to carriage 818 being moved away in the first direction from brush-arm assembly 802 to disengage brush 822 from brush-arm assembly 802, brush-arm assembly 802 is supported by tool-support arm 836 to prevent movement of brush-arm assembly 802 in the first direction.

Referring generally to, e.g., FIGS. 1, 3-11, and 17 and particularly to FIG. 18B, method 900 further comprises (block 918) with carriage 818 in the second position, placing a portion of brush 822, loaded onto brush-arm assembly 802 of end-effector 102, between two blades 824, opposing each other and fixed to carriage 818. Gap 826, defined between two blades 824, is narrower than at least a portion of head 825 of brush 822. At least a portion of head 825 of brush 822 and at least a portion of shank 827 of brush 822 are on opposite sides of two blades 824. The preceding subject matter of this paragraph characterizes example 33 of the present disclosure, wherein example 33 also includes the subject matter according to example 32, above.

Two blades 824 may allow for unloading or disengaging brush 822 from brush-arm assembly 802 when brush 822 is placed between two blades 824 and carriage 818 is moved in a first direction away from brush-arm assembly 802, from a second position to a first position. Configuring two blades 824 such that gap 826 is formed that converges toward base 814 provides a tight fit on brush 822 loaded into brush-arm assembly 802 as it is placed within gap 826. In another example, providing gap 826 that converges toward base 814 allows brushes 822 of various sizes to fit between two blades 824 to be unloaded from brush-arm assembly 802.

Referring generally to FIGS. 1 and 9-11 and particularly to, e.g., FIG. 18B, method 900 further comprises, (block 920) with carriage 818 in the second position and the portion of brush 822, loaded onto brush-arm assembly 802 of end-effector 102, between two blades 824, moving carriage 818 in the first direction to the first position to unload brush 822 from brush-arm assembly 802. The preceding subject matter of this paragraph characterizes example 34 of the present disclosure, wherein example 34 also includes the subject matter according to example 33, above.

Moving carriage 818 in the first direction to the first position allows removal of brush 822 from brush-arm assembly 802 for disposal, for example, of a used brush 822, and prepares brush-arm assembly 802 to be loaded with a different brush 822.

Referring generally to FIGS. 1, 12-13, and 15-16 and particularly to, e.g., FIG. 18B, according to method 900, (block 922) when carriage 818 is in the first position relative to stationary component 832, locating brush-arm assembly 802 of end-effector 102 with respect to stationary component 832, such that brush-arm assembly 802 is in contact with stationary component 832, comprises mating brush-arm assembly 802 with second slot 835 of stationary component 832. Second slot 835 of stationary component 832 is aligned along a third axis, coincident with or parallel to axis A, with tool receptacle 828, which contains calibration tool 830, having second symmetry axis C and tool tip 831. The preceding subject matter of this paragraph characterizes example 35 of the present disclosure, wherein example 35 also includes the subject matter according to any one of examples 27 to 38, above.

Use of second slot 835 allows for secure placement of brush-arm assembly 802 while calibration tool 830 is loaded into brush-arm assembly 802. Second slot 835 may be shaped to complement at least a portion of brush-arm assembly 802. For example, second slot 835 may have a shape that complements a top portion of brush-arm assembly 802 such that brush-arm assembly 802 securely fits within second slot 835. Use of second slot 835 aligned with tool receptacle 828 along a third axis coincident with axis A allows brush-arm assembly 802, when placed within second slot 835, to be aligned with calibration tool 830 so that calibration tool 830 can be loaded into brush-arm assembly 802 when carriage 818 is moved from a first position to a third position.

Referring generally to FIGS. 1 and 15-16 and particularly to, e.g., FIG. 18B, method 900 further comprises, (block 924) with brush-arm assembly 802 of end-effector 102 mated with second slot 835 of stationary component 832, selectively moving carriage 818 relative to stationary component 832 and brush-arm assembly 802, in the second direction, into the second position to load calibration tool 830 onto brush-arm assembly 802 of end-effector 102. The preceding subject matter of this paragraph characterizes example 36 of the present disclosure, wherein example 36 also includes the subject matter according to example 35, above.

Loading calibration tool 830 onto brush-arm assembly 802 allows for calibration of brush-arm assembly 802 using calibration tool 830.

Referring generally to FIGS. 1 and 15-16 and particularly to, e.g., FIG. 18B, method 900 further comprises (block 926) selectively preventing movement of calibration tool 830 in the second direction relative to carriage 818. The preceding subject matter of this paragraph characterizes example 37 of the present disclosure, wherein example 37 also includes the subject matter according to example 35, above.

Selectively preventing movement of calibration tool 830 in the second direction allows for securing calibration tool 830 within tool receptacle 828.

Referring generally to FIGS. 1 and 13-16 and particularly to, e.g., FIG. 18B, according to method 900, (block 928) selectively preventing movement of calibration tool 830 relative to carriage 818 in the second direction comprises selectively engaging at least one pin 842 with calibration tool 830 when calibration tool 830 is placed in tool receptacle 828. The preceding subject matter of this paragraph characterizes example 38 of the present disclosure, wherein example 38 also includes the subject matter according to example 37, above.

Selectively engaging at least one pin 842 with calibration tool 830 when calibration tool 830 is placed in tool receptacle 828 provides for securing calibration tool 830 in tool receptacle 828.

Referring generally to FIGS. 1 and 13-16 and particularly to, e.g., FIGS. 18B and 18C, method 900 further comprises (block 930) disengaging at least one pin 842 from calibration tool 830 to selectively enable the movement of calibration tool 830 in the second direction relative to carriage 818. Additionally, method 900 comprises, (block 932) with brush-arm assembly 802 of end-effector 102 mated with second slot 835 of stationary component 832, selectively moving carriage 818 relative to stationary component 832 and brush-arm assembly 802 of end-effector 102, in the second direction, into the second position to load calibration tool 830 onto brush-arm assembly 802 of end-effector 102. The preceding subject matter of this paragraph characterizes example 39 of the present disclosure, wherein example 39 also includes the subject matter according to example 38, above.

Disengaging pin 842 from calibration tool 830 allows calibration tool to move in the second direction, e.g. to be removed from tool receptacle 828 and loaded onto brush-arm assembly 802.

Referring generally to FIGS. 1 and 12 and particularly to, e.g., FIG. 18C, method 900 further comprises (block 934) calibrating controller 810, operatively coupled with brush-arm assembly 802 of end-effector 102, by determining, relative to brush-arm assembly 802 of end-effector 102, parameters comprising an orientation of second symmetry axis C of calibration tool 830, loaded onto brush-arm assembly 802, and generating an output of the parameters. The preceding subject matter of this paragraph characterizes example 40 of the present disclosure, wherein example 40 also includes the subject matter according to any one of examples 35 to 39, above.

Determining parameters, such as an orientation of symmetry axis C of calibration tool 830 loaded onto brush-arm assembly 802 relative to brush-arm assembly 802, allows for automated calibration of brush-arm assembly 802. Generating an output of the parameters allows for controller 810 to calibrate and control apparatus 812, brush-arm assembly 802, and/or robot 806.

Referring generally to FIGS. 1 and 12 and particularly to, e.g., FIG. 18C, according to method 900, (block 936) the parameters further comprise a first offset of tool tip 831 of calibration tool 830, loaded onto brush-arm assembly 802, from brush-arm assembly 802. The preceding subject matter of this paragraph characterizes example 41 of the present disclosure, wherein example 41 also includes the subject matter according to example 40, above.

Determining a first offset of tool tip 831 of calibration tool 830 relative to brush-arm assembly 802 provides for automated and accurate calibration of brush-arm assembly 802.

Referring generally to FIGS. 1 and 12 and particularly to, e.g., FIG. 18C, method 900 further comprises (block 942) determining a second offset of brush tip 823, from brush-arm assembly 802, by one of subtracting or adding an archived value, corresponding to a difference between the first offset of tool tip 831 of calibration tool 830 and the second offset of brush tip 823, to or from the first offset of tool tip 831 of calibration tool 830. The preceding subject matter of this paragraph characterizes example 42 of the present disclosure, wherein example 42 also includes the subject matter according to example 41, above.

Determining a second offset of brush tip 823 of brush 822 loaded onto brush-arm assembly 802 provides for automated and accurate calibration of brush-arm assembly 802. For example, controller 810 may determine a second offset of brush tip 823 by adding or subtracting an archived value corresponding to a difference between the first offset of tool tip 831 of calibration tool 830 and the second offset of brush tip 823 to/from the first offset of tool tip 831 of calibration tool 830.

Referring generally to FIG. 1 and particularly to, e.g., FIG. 18C, according to method 900, (block 938) the parameters are determined using vision system 808. The preceding subject matter of this paragraph characterizes example 43 of the present disclosure, wherein example 43 also includes the subject matter according to any one of examples 40 to 42, above.

Use of vision system 808 allows for automated calibration of brush-arm assembly 802. In one example, vision system 808 comprises one or more cameras, sensors, or other imaging or monitoring components for determining calibration parameters associated with calibration tool 830.

Referring generally to FIGS. 1 and 12 and particularly to, e.g., FIG. 18C, according to method 900, (block 940) vision system 808 captures at least one image of calibration tool 830 that is loaded onto brush-arm assembly 802 and, based on at least the one image, determines, relative to brush-arm assembly 802 of end-effector 102, the orientation of second symmetry axis C of calibration tool 830. The preceding subject matter of this paragraph characterizes example 44 of the present disclosure, wherein example 44 also includes the subject matter according to example 43, above.

Use of vision system 808 that captures an image of calibration tool 830 loading onto brush-arm assembly 102 allows for automated calibration of brush-arm assembly 802. For example, vision system 808 may determine the parameters based on the image, such as an orientation of symmetry axis C of calibration tool 830 loaded onto brush-arm assembly 802 relative to brush-arm assembly 802, used to calibrate brush-arm assembly 802.

Referring generally to FIGS. 1 and 3-6 and particularly to, e.g., FIG. 18C, according to method 900, (block 944) calibrating controller 810 further comprises manually mating brush-arm assembly 802 with slot 834 of stationary component 832 and programming controller 810 with data, representing a position of brush-arm assembly 802, mated with slot 834, relative to stationary component 832. The preceding subject matter of this paragraph characterizes example 45 of the present disclosure, wherein example 45 also includes the subject matter according to any one of examples 40 to 44, above.

Manually mating brush-arm assembly 802 with slot 834 of stationary component 832 allows calibration of brush-arm assembly 802. For example, manually mating brush-arm assembly 802 with slot 834 provides data that represents a position of brush-arm assembly 802 that can be used to program controller 810 such that controller 810 learns the position of brush-arm assembly 802 relative to slot 834.

Examples of the present disclosure may be described in the context of aircraft manufacturing and service method 1100 as shown in FIG. 19 and aircraft 1102 as shown in FIG. 20. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 20, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of manipulating a brush relative to a brush-arm assembly of an end-effector, the method comprising steps of:
    locating a carriage, comprising a brush receptacle, in one of a first position or a second position relative to a stationary component, wherein the carriage is selectively movable relative to the stationary component along a first axis;
    with the carriage in one of the first position or the second position, different from the first position, relative to the stationary component, locating the brush-arm assembly of the end-effector with respect to the stationary component so that the brush-arm assembly is in contact with the stationary component; and
    moving the carriage in a second direction along the first axis toward the stationary component, from the first position to a third position, to load the brush onto the brush-arm assembly of the end-effector, or moving the carriage in a first direction along the first axis away from the stationary component from the second position to the first position to unload the brush from the brush-arm assembly,
    wherein:
        when the carriage is in the first position relative to the stationary component, the step of locating the brush-arm assembly of the end-effector with respect to the stationary component, such that the brush-arm assembly is in contact with the stationary component, comprises mating the brush-arm assembly with a slot of the stationary component,
        the slot of the stationary component is spaced from a tool receptacle in a direction of a second axis, parallel to the first axis, wherein the tool receptacle contains a calibration tool, having a symmetry axis and a tool tip;
        the method further comprises selectively preventing movement of the calibration tool in the second direction relative to the carriage; and
        the step of selectively preventing movement of the calibration tool relative to the carriage in the second direction comprises selectively engaging at least one pin with the calibration tool.

2. The method according to claim 1, wherein, when the carriage is in the first position relative to the stationary component, the step of locating the brush-arm assembly of the end-effector with respect to the stationary component, such that the brush-arm assembly is in contact with the stationary component, comprises mating the brush-arm assembly with a second slot of the stationary component, wherein the second slot of the stationary component is spaced from the brush receptacle, which contains the brush, in a direction of a third axis, parallel to the first axis.

3. The method according to claim 2, further comprising, with the carriage in the first position relative to the stationary component and the brush-arm assembly of the end-effector mated with the second slot of the stationary component, a step of loading the brush, located in the brush receptacle of the carriage, onto the brush-arm assembly of the end-effector by selectively moving the carriage in the second direction relative to the stationary component from the first position to the third position.

4. The method according to claim 1, further comprising a step of, with the carriage in the second position and the brush loaded onto the brush-arm assembly of the end-effector, selectively moving the carriage relative to the stationary component and the brush-arm assembly, in the first direction, into the first position to remove the brush from the brush receptacle.

5. The method according to claim 1, wherein, when the carriage is in the second position relative to the stationary component, the step of locating the brush-arm assembly of the end-effector with respect to the stationary component so that the brush-arm assembly is in contact with the stationary component comprises resting the brush-arm assembly on a tool-support arm, fixed relative to the stationary component.

6. The method according to claim 5, further comprising a step of, with the carriage in the second position, placing a portion of the brush, loaded onto the brush-arm assembly of the end-effector, between two blades, opposing each other and fixed to the carriage, wherein the portion of the brush between the two blades is between a portion of a head of the brush and a portion of a shank of the brush, wherein a gap, defined between the two blades, is narrower than at least the portion of the head of the brush and wherein at least the portion of the head of the brush and at least the portion of the shank of the brush are on opposite sides of the two blades.

7. The method according to claim 6, further comprising a step of, with the carriage in the second position and the portion of the brush, loaded onto the brush-arm assembly of the end-effector, between the two blades and between the portion of the head of the brush and the portion of the shank of the brush, moving the carriage in the first direction to the first position to unload the brush from the brush-arm assembly.

8. The method according to claim 1, further comprising a step of, with the brush-arm assembly of the end-effector mated with the slot of the stationary component, selectively moving the carriage relative to the stationary component and the brush-arm assembly, in the second direction, into the second position to load the calibration tool onto the brush-arm assembly of the end-effector.

9. The method according to claim 1, further comprising steps of:
   disengaging the at least one pin from the calibration tool to selectively enable the movement of the calibration tool in the second direction relative to the carriage; and
   with the brush-arm assembly of the end-effector mated with the slot of the stationary component, selectively moving the carriage relative to the stationary component and the brush-arm assembly of the end-effector, in the second direction, into the second position to load the calibration tool onto the brush-arm assembly of the end-effector.

10. The method according to claim 9, wherein the at least one pin is coupled to the carriage and co-movable with the carriage relative to the stationary component.

11. A method of manipulating a brush relative to a brush-arm assembly of an end-effector, the method comprising steps of:
   locating a carriage, comprising a brush receptacle, in one of a first position or a second position relative to a stationary component, wherein the carriage is selectively movable relative to the stationary component along a first axis;
   with the carriage in one of the first position or the second position, different from the first position, relative to the stationary component, locating the brush-arm assembly of the end-effector with respect to the stationary component so that the brush-arm assembly is in contact with the stationary component; and
   moving the carriage in a second direction along the first axis toward the stationary component, from the first position to a third position, to load the brush onto the brush-arm assembly of the end-effector, or moving the carriage in a first direction along the first axis away from the stationary component from the second position to the first position to unload the brush from the brush-arm assembly,
   wherein:
      when the carriage is in the first position relative to the stationary component, the step of locating the brush-arm assembly of the end-effector with respect to the stationary component, such that the brush-arm assembly is in contact with the stationary component, comprises mating the brush-arm assembly with a slot of the stationary component;
      the slot of the stationary component is spaced from a tool receptacle in a direction of a second axis, parallel to the first axis, wherein the tool receptacle contains a calibration tool, having a symmetry axis and a tool tip; and
      the method further comprises a step of calibrating a controller, operatively coupled with the brush-arm assembly of the end-effector, by determining, relative to the brush-arm assembly of the end-effector, parameters comprising an orientation of the symmetry axis of the calibration tool, loaded onto the brush-arm assembly, and generating an output of the parameters.

12. The method according to claim 11, wherein the parameters further comprise a first offset of the tool tip of the calibration tool, loaded onto the brush-arm assembly, from the brush-arm assembly.

13. The method according to claim 12, further comprising a step of determining a second offset of a brush tip, from the brush-arm assembly, by subtracting an archived value, corresponding to a difference between the first offset of the tool tip of the calibration tool and the second offset of the brush tip, from the first offset of the tool tip of the calibration tool or by adding the archived value to the first offset of the tool tip of the calibration tool.

14. The method according to claim 11, wherein the parameters are determined using a vision system.

15. The method according to claim 14, wherein the vision system captures at least one image of the calibration tool that is loaded onto the brush-arm assembly and, based on at least the one image, determines, relative to the brush-arm assembly of the end-effector, the orientation of the symmetry axis of the calibration tool.

16. The method according to claim 11, wherein the step of calibrating the controller further comprises manually mating the brush-arm assembly with a second slot of the stationary component and programming the controller with data, representing a position of the brush-arm assembly, mated with the second slot, relative to the stationary component.

17. The method according to claim 11, further comprising a step of selectively preventing movement of the calibration tool in the second direction relative to the carriage.

18. The method according to claim 17, wherein the step of selectively preventing movement of the calibration tool relative to the carriage in the second direction comprises selectively engaging at least one pin with the calibration tool.

19. The method according to claim 18, further comprising steps of:
- disengaging the at least one pin from the calibration tool to selectively enable the movement of the calibration tool in the second direction relative to the carriage; and
- with the brush-arm assembly of the end-effector mated with the slot of the stationary component, selectively moving the carriage relative to the stationary component and the brush-arm assembly of the end-effector, in the second direction, into the second position to load the calibration tool onto the brush-arm assembly of the end-effector.

20. The method according to claim 11, wherein, when the carriage is in the first position relative to the stationary component, the step of locating the brush-arm assembly of the end-effector with respect to the stationary component, such that the brush-arm assembly is in contact with the stationary component, comprises mating the brush-arm assembly with a second slot of the stationary component, and the second slot of the stationary component is spaced from the brush receptacle, which contains the brush, in a direction of a third axis, parallel to the first axis.

* * * * *